United States Patent
Takano et al.

(10) Patent No.: US 9,457,842 B2
(45) Date of Patent: Oct. 4, 2016

(54) PARKING MODE SELECTION APPARATUS AND METHOD USING THE STEERING WHEEL

(75) Inventors: Teruhisa Takano, Kawasaki (JP); Masahiko Kikuchi, Atsugi (JP); Hajime Kasai, Atsugi (JP); Yoshiro Takamatsu, Ebina (JP); Kouki Minegishi, Atsugi (JP); Makoto Shibano, Isehara (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 450 days.

(21) Appl. No.: 13/702,344

(22) PCT Filed: Jun. 6, 2011

(86) PCT No.: PCT/JP2011/062976
§ 371 (c)(1),
(2), (4) Date: Feb. 11, 2013

(87) PCT Pub. No.: WO2011/155464
PCT Pub. Date: Dec. 15, 2011

(65) Prior Publication Data
US 2013/0144492 A1 Jun. 6, 2013

(30) Foreign Application Priority Data

Jun. 9, 2010 (JP) ................. 2010-132028
Jun. 9, 2010 (JP) ................. 2010-132037
Jun. 9, 2010 (JP) ................. 2010-132055

(51) Int. Cl.
*B62D 15/00* (2006.01)
*B62D 15/02* (2006.01)

(52) U.S. Cl.
CPC ......... *B62D 15/027* (2013.01); *B62D 15/0285* (2013.01); *B60K 2350/1088* (2013.01)

(58) Field of Classification Search
CPC ........... B60W 30/06; B60R 2300/102; B60R 2300/806; B60R 2300/303; B62D 15/0285; B60T 2201/10
See application file for complete search history.

(56) References Cited

U.S. PATENT DOCUMENTS 7,277,123 B1 * 10/2007 Okamoto et al. ............. 348/148
7,366,595 B1 4/2008 Shimizu et al.
(Continued)

FOREIGN PATENT DOCUMENTS

JP 2001-6097 A 1/2001
JP 2004-123059 A 4/2004
(Continued)

OTHER PUBLICATIONS

M. Suzuki et al., Development of Around View System, *Proceedings of Society of Automotive Engineers of Japan*, No. 116-07, (Oct. 2007), pp. 17-22.
(Continued)

*Primary Examiner* — John R Olszewski
*Assistant Examiner* — James M McPherson
(74) *Attorney, Agent, or Firm* — Foley & Lardner LLP

(57) ABSTRACT

A parking mode selection apparatus selects one parking mode among from plural parking modes including at least a perpendicular parking or a parallel parking. The parking mode selection apparatus includes a steer angle detector that detects a steer angle of a steering wheel, an operation detector that detects, based on the steer angle detected by the steer angle detector, a predetermined operation in which the steering wheel is returned to a neutral position after rotated to a right or a left, and a parking mode selector. The parking mode selector selects, when the predetermined operation is detected by the operation detector, a parking mode that coincides with a steered direction to the right or the left of the steer angle detected by the steer angle detector and is associated with said steer angle.

21 Claims, 23 Drawing Sheets

(56) References Cited

U.S. PATENT DOCUMENTS

| | | | |
|---|---|---|---|
| 8,012,060 B2* | 9/2011 | Shibata et al. | 477/3 |
| 8,275,518 B2 | 9/2012 | Watanabe et al. | |
| 2004/0260439 A1* | 12/2004 | Endo et al. | 701/36 |
| 2004/0267423 A1* | 12/2004 | Iwazaki et al. | 701/41 |
| 2005/0021203 A1* | 1/2005 | Iwazaki et al. | 701/36 |
| 2005/0027414 A1* | 2/2005 | Iwazaki et al. | 701/36 |
| 2005/0027415 A1* | 2/2005 | Iwazaki et al. | 701/36 |
| 2005/0049766 A1 | 3/2005 | Tanaka et al. | |
| 2005/0057374 A1* | 3/2005 | Tanaka et al. | 340/932.2 |
| 2005/0060073 A1* | 3/2005 | Tanaka et al. | 701/36 |
| 2006/0287825 A1 | 12/2006 | Shimizu et al. | |
| 2006/0287826 A1 | 12/2006 | Shimizu et al. | |
| 2008/0007618 A1* | 1/2008 | Yuasa | 348/118 |
| 2008/0033606 A1* | 2/2008 | Okamoto et al. | 701/28 |
| 2008/0033647 A1 | 2/2008 | Milark et al. | |
| 2010/0049402 A1* | 2/2010 | Tanaka | 701/41 |
| 2010/0089677 A1* | 4/2010 | Tanaka et al. | 180/204 |
| 2010/0106372 A1* | 4/2010 | Watanabe et al. | 701/41 |
| 2010/0220189 A1* | 9/2010 | Yanagi | 348/148 |
| 2010/0238051 A1* | 9/2010 | Suzuki et al. | 340/932.2 |
| 2010/0289634 A1* | 11/2010 | Ikeda et al. | 340/441 |
| 2011/0087406 A1* | 4/2011 | Barth et al. | 701/41 |
| 2011/0095910 A1* | 4/2011 | Takano | 340/932.2 |
| 2013/0231863 A1* | 9/2013 | Okamoto et al. | 701/533 |

FOREIGN PATENT DOCUMENTS

| | | |
|---|---|---|
| JP | 2005-67565 A | 3/2005 |
| JP | 2008-201363 A | 9/2008 |
| JP | 2009-298179 A | 12/2009 |
| RU | 2 380 725 C2 | 1/2010 |

OTHER PUBLICATIONS

Russian Decision on Grant and translation dated Mar. 14, 2014 (18 pgs.).

* cited by examiner

FIG. 5
(a)
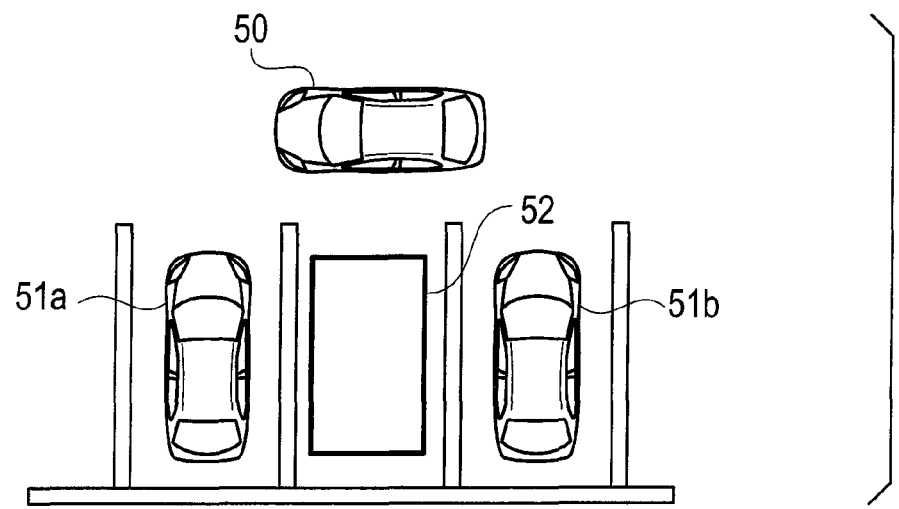
(b)
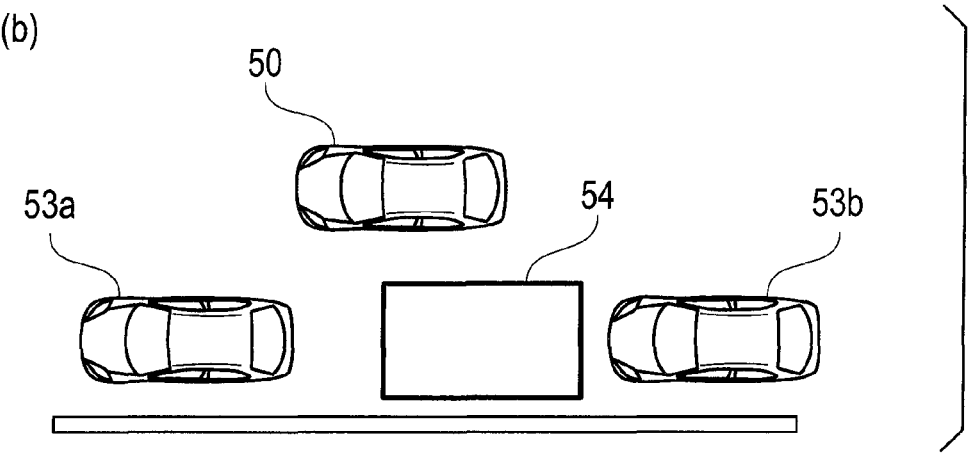
(c)
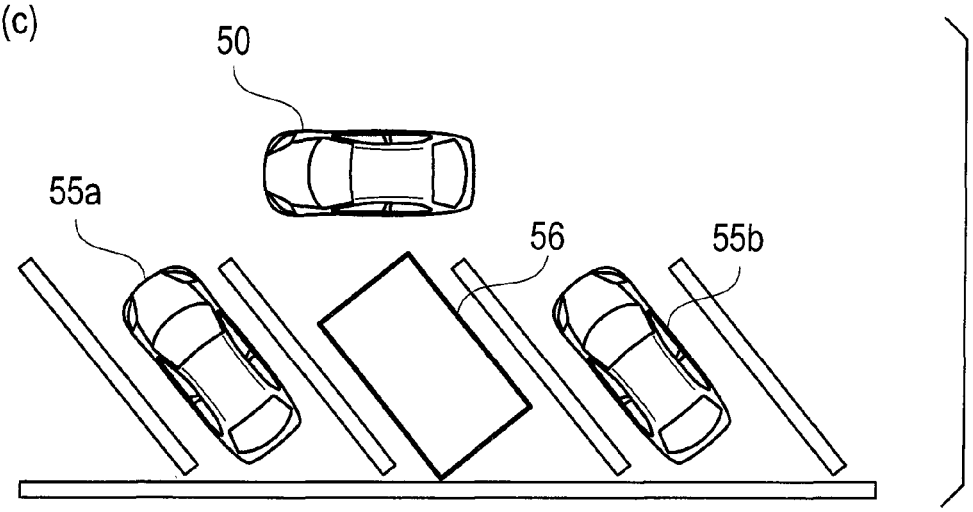

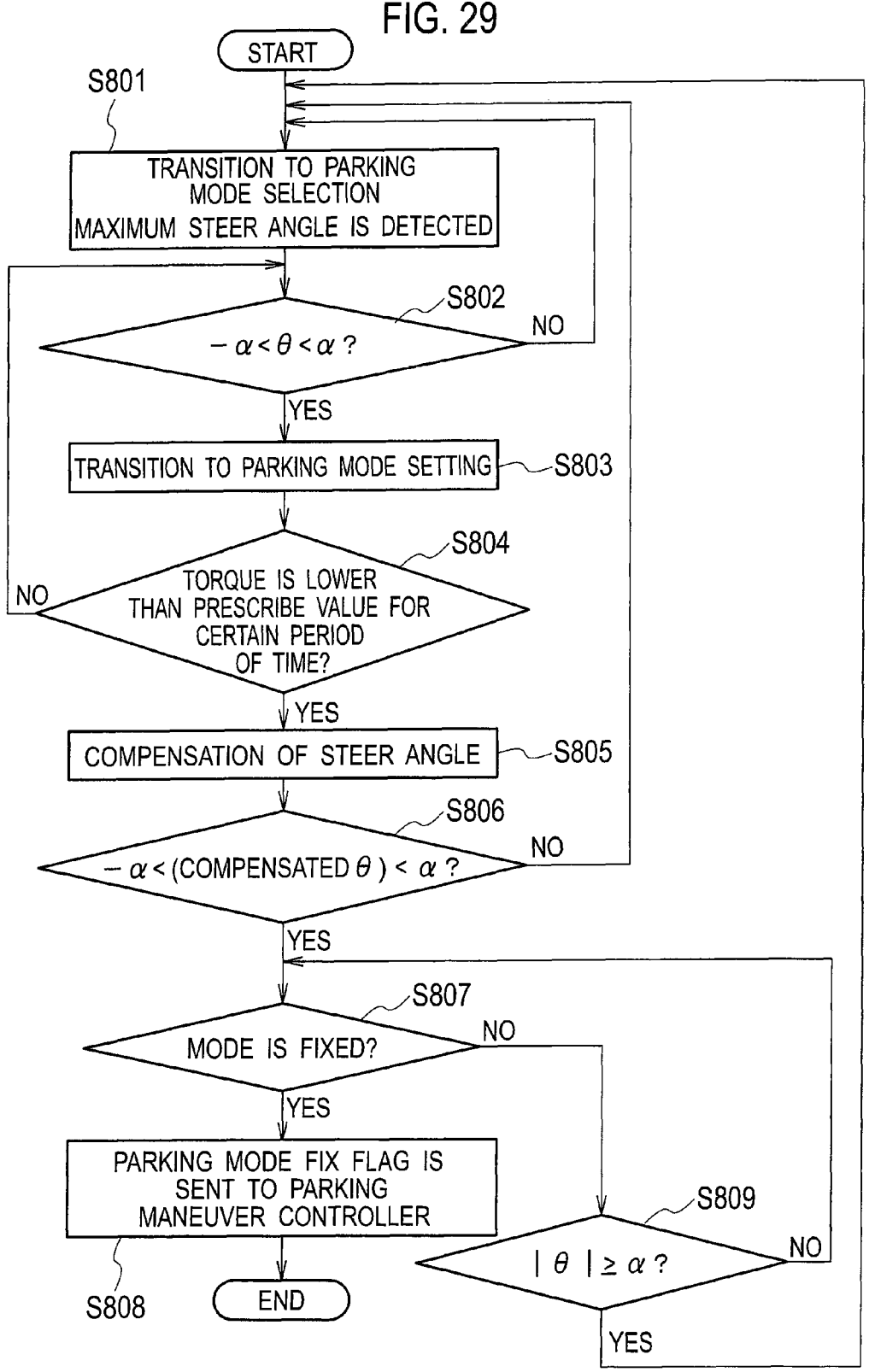

PARKING MODE SELECTION APPARATUS AND METHOD USING THE STEERING WHEEL

TECHNICAL FIELD

The present invention relates to a parking mode selection apparatus that displays an environmental image around a vehicle to a driver in order to invite the driver to select a parking mode of the vehicle, and to a method thereof.

BACKGROUND ART

Conventionally, a parking assistance apparatus for parking a vehicle at a parking target position has been developed. Such a prior-art parking assistance apparatus is disclosed in a Patent Literature 1 listed below.

In a parking assistance apparatus disclosed in the patent Literature 1, plural parking target positions are temporally set together with parking modes (parallel parking, perpendicular parking and so on) in a state where a vehicle is being stopped at a given stop position. Then, a parking target position at which a driver intends to park is selected among the temporarily-set plural parking positions based on a driver's steering operation. Specifically, when a steering wheel is steered to the left by more-than or equal-to a predetermined angle and then the vehicle is moved, a right-side perpendicular parking is selected (run forward on the left and then run backward to park perpendicularly on the right side). Alternatively, when a steering wheel is steered to the right by more-than or equal-to a predetermined angle and then the vehicle is moved, a left-side perpendicular parking is selected (run forward on the right and then run backward to park perpendicularly on the left side). Alternatively, when a vehicle is moved without steering a steering wheel by more-than or equal-to a predetermined angle, a left-side parallel parking is selected (run forward with a small steer angle and then run backward to park parallel). Then, a parking assistance is started based on a selected parking target position (parking mode).

CITATION LIST

Patent Literature

Patent Literature 1: Japanese Patent Unexamined Publication No. 2008-201363

SUMMARY OF INVENTION

However, in order to park on the right side in the above-mentioned parking assistance apparatus, it is needed to select a parking Ytarget position by steering a steering wheel to the left oppositely. Therefore, the side to park and the side to operate is opposite, so that it is a confusing operation for a driver who is unfamiliar with driving a car.

An object of the present invention provides a parking mode selection apparatus by which a parking target position can be easily set and that can improve operability, and a method thereof.

A first aspect of the present invention provides a parking mode selection apparatus for selecting one parking mode among from a plurality of parking modes including at least a perpendicular parking or a parallel parking, the apparatus including: a steer angle detector (steer angle detection means) that detects a steer angle of a steering wheel; an operation detector (operation detection means) that detects, based on the steer angle detected by the steer angle detector, a predetermined operation in which the steering wheel is returned to a neutral position after rotated to a right or a left; and a parking mode selector (parking mode selection means) that selects, when the predetermined operation is detected by the operation detector, a parking mode that coincides with a steered direction to the right or the left of the steer angle detected by the steer angle detector and is associated with said steer angle. Note that a steered amount and a steered direction can be known from the detected steer angle.

A second aspect of the present invention provides a parking mode selection method for selecting one parking mode among from a plurality of parking modes including at least a perpendicular parking or a parallel parking, the method comprising: detecting a steer angle of a steering wheel; detecting, based on the detected steer angle, a predetermined operation in which the steering wheel is returned to a neutral position after rotated to a right or a left; and selecting, when the predetermined operation is detected, a parking mode that coincides with a steered direction to the right or the left of the detected steer angle and is associated with said steer angle.

BRIEF DESCRIPTION OF DRAWINGS

FIG. 5 They are plan views for explaining parking modes of parking target positions, (a) shows a left-side perpendicular parking, (b) shows a left-side parallel parking, and (c) shows an angular parking.

FIG. 29 It is a flowchart showing a parking mode setting and fixing process in a parking mode selection apparatus according to a seventh embodiment.

DESCRIPTION OF EMBODIMENTS

Embodiments will be explained hereinafter with reference to the drawings.

First Embodiment

[Configuration of Parking Mode Selection Apparatus]

A first embodiment will be explained with reference to FIGS. 1 to 10.

Figure 1:
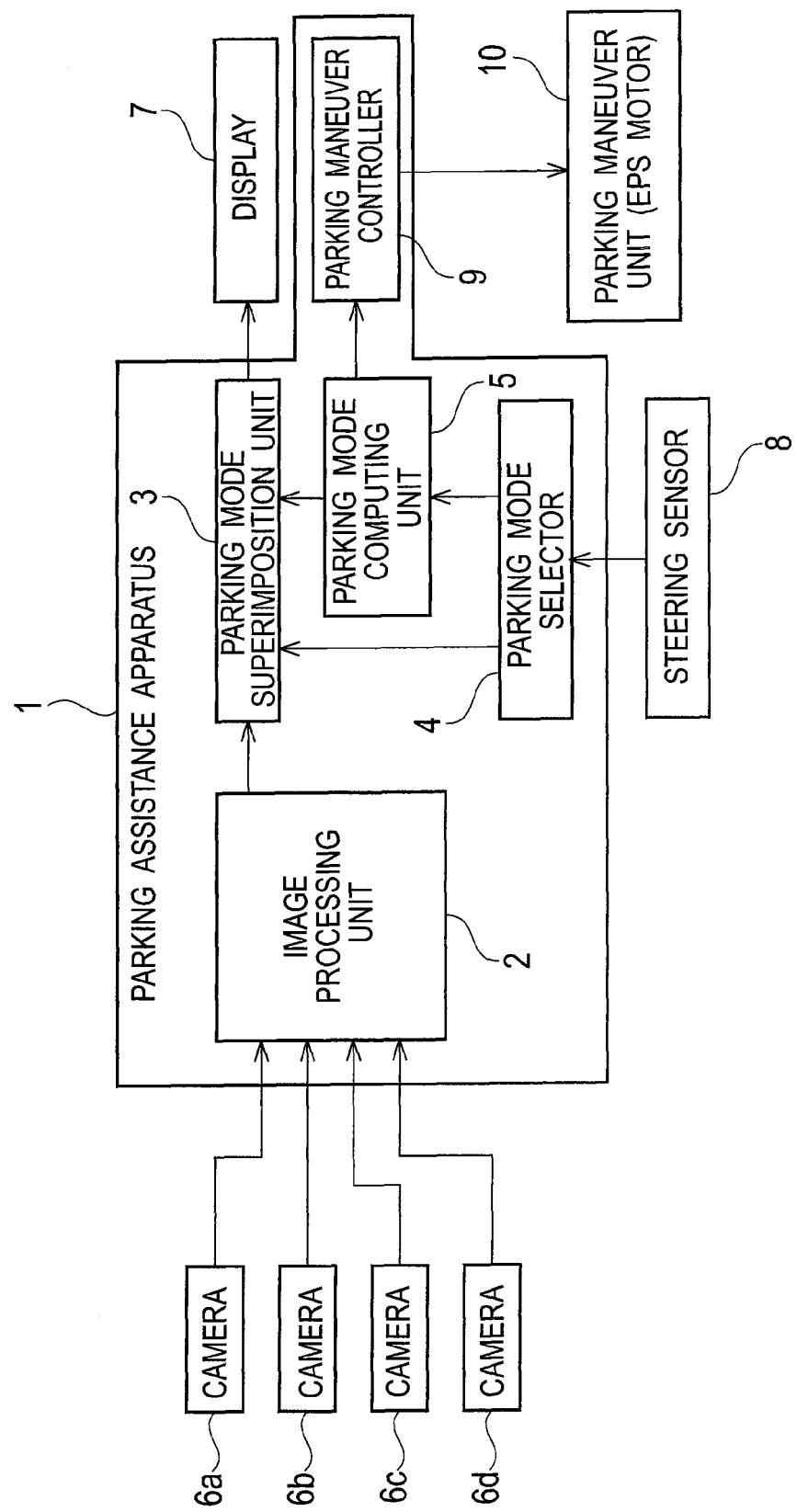
FIG. 1 It is a block diagram showing a configuration of a parking mode selection apparatus according to a first embodiment.

As shown in FIG. 1, the parking mode selection apparatus 1 includes an image processing unit 2, a parking mode superimposition unit 3, a parking mode selector (also served as a operation detector) 4, a parking mode computing unit 5, and a parking maneuver controller 9. The image processing unit 2 transforms movies of an environment of a vehicle to generate a top view movie. The parking mode superimposition unit 3 superimposes an image that indicates a parking mode on the top view movie of an environment of a vehicle. The parking mode selector 4 selects a parking target position and a parking mode based on a driver's steering operation. The parking mode computing unit 5 computes a parking route to the parking target position. In addition, the parking mode selection apparatus 1 is connected also with cameras 6a to 6d, a display 7, steering sensor (a steer angle detector) 8, and a parking maneuver unit 10. The cameras 6a to 6d take movies of an environment of a vehicle and then send them to the image processing unit 2. The display 7 presents an image(s) such as a top view movie from the parking mode superimposition unit 3 to passengers. The steering sensor 8 detects an operation direction and an operation amount of a steering wheel and then sends them to the parking mode selector 4. The parking maneuver unit 10 is an EPS (electrical power steering) motor specifically, and controlled by the parking maneuver controller 9 under a parking assistance.

The parking mode selection apparatus 1 is achieved by storing a parking assistance program in a ROM (Read Only Memory) and executing the program using a CPU, and the above-mentioned compositional units are configured of the CPU, the ROM and so on. Various calculations are calculated in a parking assistance control unit. Information input to the parking assistance control unit includes, for example, shift range information from an AT/CVT control unit, wheel speed information from an ABS control unit, steer angle information from a steer sensor control unit, engine rotational speed information from an ECM, and so on. In addition, Information output therefrom includes, for example, display screen information to an AVM (around view monitor) control unit, automatic steering command information to an EPS control unit, command information for warning or the like to a meter control unit, and so on. The input and output information is transferred accordingly by communications via a CAN (Controller Area Network), wirings by real wires or the like in view of installation ability to a vehicle, establishment of reliability or the like.

Figure 2:
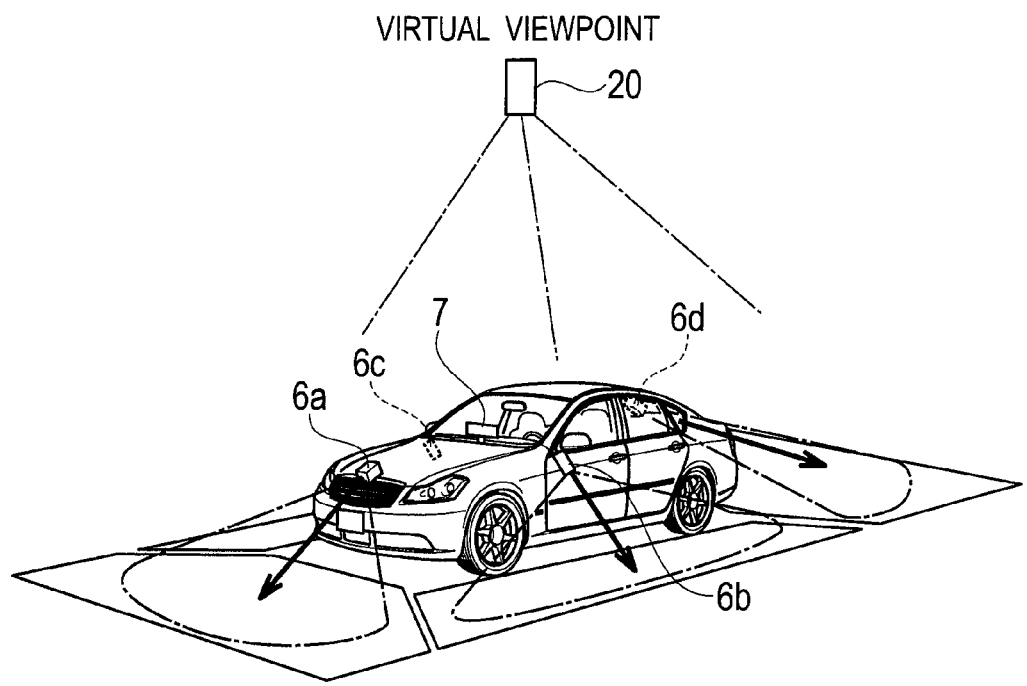
FIG. 2 It is a perspective view showing an arrangement example of cameras.

The cameras 6a to 6d take movies to be used as an interface between the parking mode selection apparatus 1 and a driver. FIG. 2 shows an arrangement example of the cameras 6a to 6d. As shown in FIG. 2, the camera 6a is arranged at a front grill of a vehicle, the camera 6d is arranged near a rear glass, and the cameras 6b and 6c are arranged at lower portions of right and left door mirrors. By using wide-angle cameras as the cameras 6a to 6d, a broader area can be presented to a driver. Taken movies are processed through a viewpoint conversion, and then a top view movie from a virtual viewpoint 20 is displayed on the display 7 installed in a vehicle cabin. Note that the vehicle is not limited to a passenger car, but may be a commercial car or a motor truck. In addition, installation positions of the cameras 6a to 6d are not limited to the arrangements in FIG. 2. For example, cameras may be installed in four corners of a vehicle, and may be installed in a roof. A rear camera may be arranged at a rear bumper, or near lamps for a license plate.

The image processing unit 2 processes the movies taken by the cameras 6a to 6d through the viewpoint conversion and a superimposition to generate the top view movie. The movies taken by the cameras 6a to 6d are movies viewed from obliquely upper positions, but converted to a movie viewed from a vertically upper position by the viewpoint conversion. With respect to such a viewpoint conversion, a method disclosed in "Development of Around View System, Proceedings of Society of Automotive Engineers of Japan, No. 116-07, (October 2007), pp. 17-22, SUZUKI Masayasu, CHINOMI Satoshi, TAKANO Teruhisa" or the like may be used.

Figure 3:
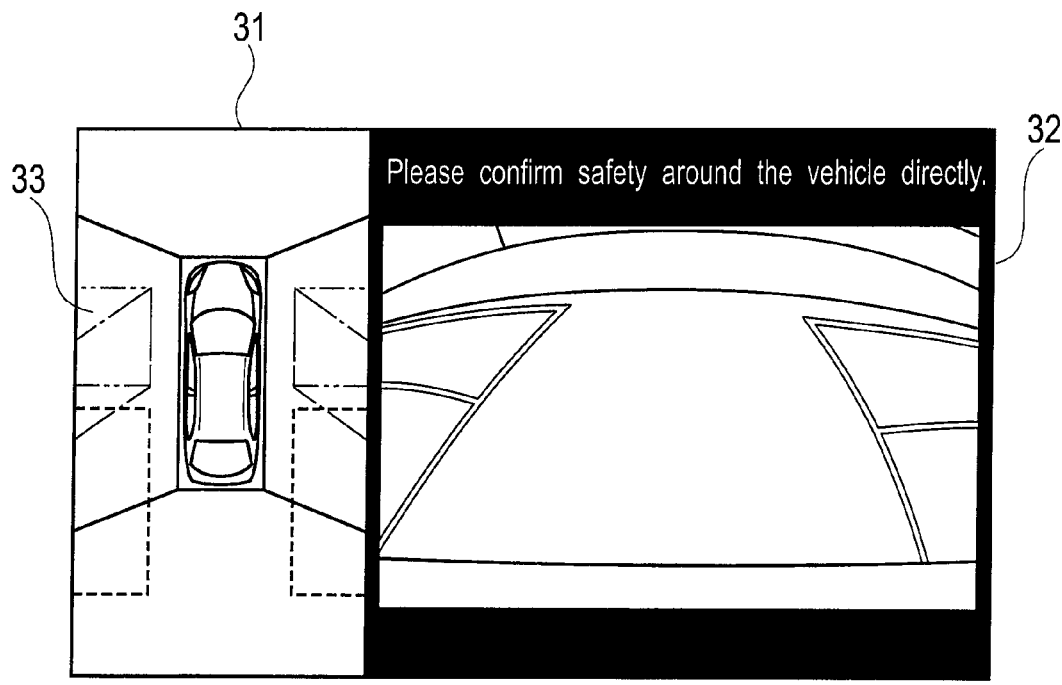
FIG. 3 It is a diagram showing a displayed screen example of a display.

The parking mode interposition unit 3 interposes an image that indicates a parking frame (a parking mode) on the top view movie generated by the image processing unit 2. This interposition of an image can be done by use of an interposition method for computer graphics. In addition, it also controls changing-over of the image of the parking frame on the display 7 according to the parking mode selected by the parking mode selector 4. FIG. 3 shows an interposed image example by the parking mode interposition unit 3. As shown in FIG. 3, the top view movie 31 after the viewpoint conversion is displayed on the left side on the display 7, and a movie taken by the cameras 6a to 6d (in FIG. 2, a movie taken by the rear camera 6d) is displayed on the right side. In addition, the image 33 that indicates a parking mode is displayed on the top view movie, and used for a selection of a parking target position.

The parking mode selector 4 changes over the image that indicates a parking mode based on a steer angle input from the steering sensor 8, and preset the parking mode that is selected. For example, it changes over total six parking modes, a perpendicular parking, a parallel parking and an angular parking each on right and left sides. A parking mode for a parking target position is selected and preset by a driver's steering operation. Note that, although a selection and a preset of a parking mode will be explained later in detail, a preset parking mode is fixed when a driver leaves his/her foot off from a brake pedal, and a parking assistance is started based on the fixed parking mode. It can be detected by a brake switch, a brake pressure sensor or the like whether or not a driver leaves his/her foot off from a brake pedal.

The parking mode computing unit 5 computes a parking route based on the parking mode fixed in the parking mode selector 4 while it feedbacks detected values by the steering sensor 8. The parking mode computing unit 5 sends the computed parking route to the parking mode interposition unit 3, and controls the parking maneuver unit 10 via the parking maneuver controller 9 based on the computed parking route.

The display 7 presents the movies after the interposition in the parking mode interposition unit 3 to the driver as visible information. For example, the display 7 is a monitor or an around view monitor in a car navigation system.

The parking maneuver unit (EPS motor) 10 is driven based on control commands from the parking maneuver controller 9 to maneuver the vehicle to the parking target position. For example, it drives road wheels based on the control commands to maneuver the vehicle to the parking target position.

[Parking Assistance Process]

Next, a parking assistance process will be explained with reference to a flowchart shown in FIG. 4.

Figure 4:
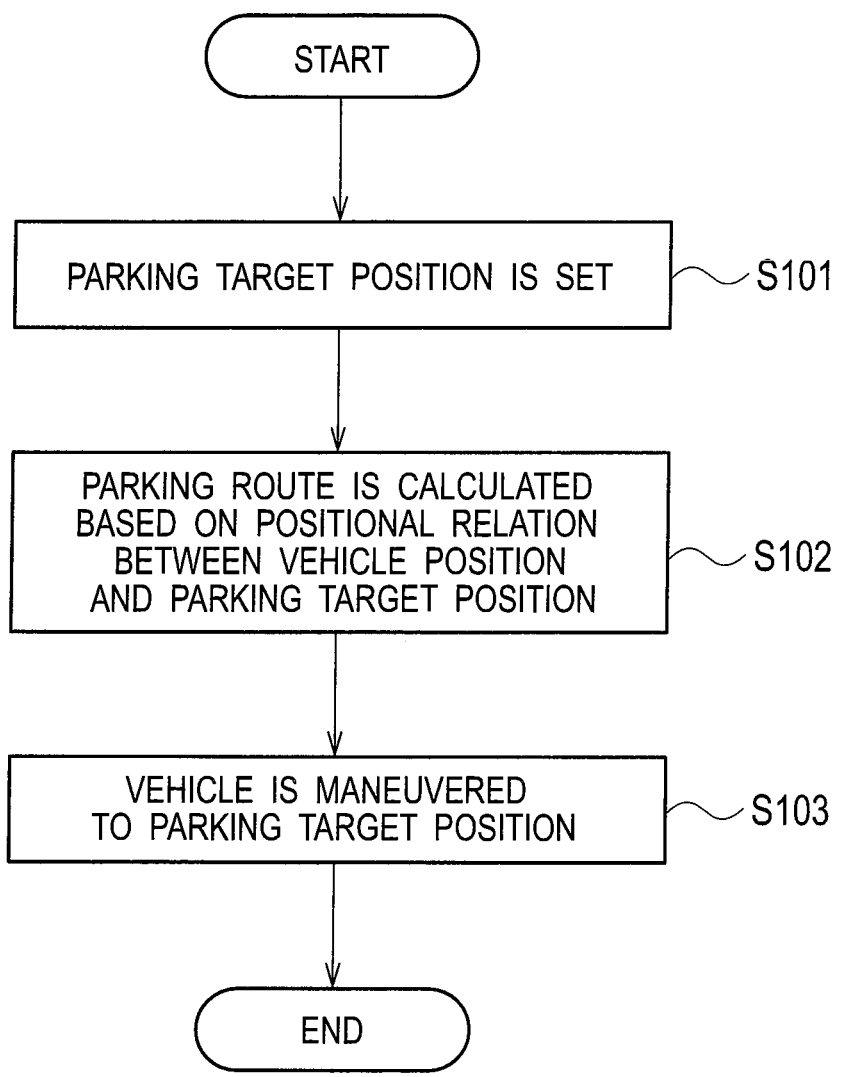
FIG. 4 It is a flowchart showing a parking assistance process.

As shown in FIG. 4, a setting process of a parking target position is executed first (step S101). This process is done beside a parking target position, and a parking target position (parking mode) is selected and set based on a driver's steering operation among from plural parking position candidates. Here, a perpendicular parking, a parallel parking and an angular parking each on right and left sides can be selected as a parking mode. These parking modes will be explained with reference to FIG. 5.

FIG. 5(a) shows a perpendicular parking. In the perpendicular parking, a vehicle 50 before parked is almost perpendicular to parked vehicles 51a and 51b, and the vehicle 50 is to be parked at a parking space 52. FIG. 5(b) shows a parallel parking. In the parallel parking, a vehicle 50 before parked is almost parallel to parked vehicles 53a and 53b, and the vehicle 50 is to be parked at a parking space 54. FIG. 5(c) shows an angular parking. In the angular parking, a vehicle 50 before parked is arranged obliquely with parked vehicles 55a and 55b, and the vehicle 50 is to be parked at a parking space 56. In the step S101, a parking mode (parking target position) is selected and set according to a driver's steering operation among from these parking modes. The parking mode selection process in the step S101 will be explained later in detail.

Subsequently, the parking mode computing unit 5 computes a parking route based on a positional relation between a position of the vehicle and the parking target position (step S102). A route matched with the parking mode set in the step S101 is loaded from a memory in which routes each associated with one of a perpendicular parking, a parallel parking and an angular parking are stored, and it is applied to an actual arrangement to compute a parking route. The computed parking route includes a path to a switch-back position and a path from the switch-back position to the parking target position.

After the parking route is computed, the vehicle is maneuvered to the parking target position (step S103). As a maneuver method of a vehicle, a method of automatically steering by the assistance system or a method in which a driver manually operates based on a recommended steering operation by the assistance system may be adopted. The parking mode computing unit 5 executes a maneuver control by computing command signals to the parking maneuver unit 10 while feeding-back the detected values by the steering sensor 8 so that the vehicle may run along the computed parking route. Note that, although an automatically steering method in which the parking mode selection apparatus 1 controls the parking maneuver unit (EPS motor) 10 is adopted in the present embodiment, the parking mode selection apparatus 1 may be applied to an assistance system by which a driver manually operates based on a recommended steering operation that is presented. In this case, the parking mode computing unit 5 executes a maneuver control by presenting the recommended steering operation through a display screen guidance on the display 7 or a voice guidance while feeding-back the detected values by the steering sensor 8 so that the vehicle may run along the computed parking route. In this instance, the display 7 or a speaker is a guidance output unit.

When the parking of the vehicle to the parking target position is completed, the parking assistance process using the parking mode selection apparatus 1 is finished.

[Parking Mode Selection Process]

Next, a parking mode selection process by the parking mode selection apparatus 1 will be explained with reference to a flowchart shown in FIG. 6 and displayed screen examples of a top view movie shown in FIG. 7. In the parking mode selection process, the parking target position (parking mode) is set only by a steering operation. The parking mode selection process is a subroutine executed in the above-explained step S101.

Figure 6:
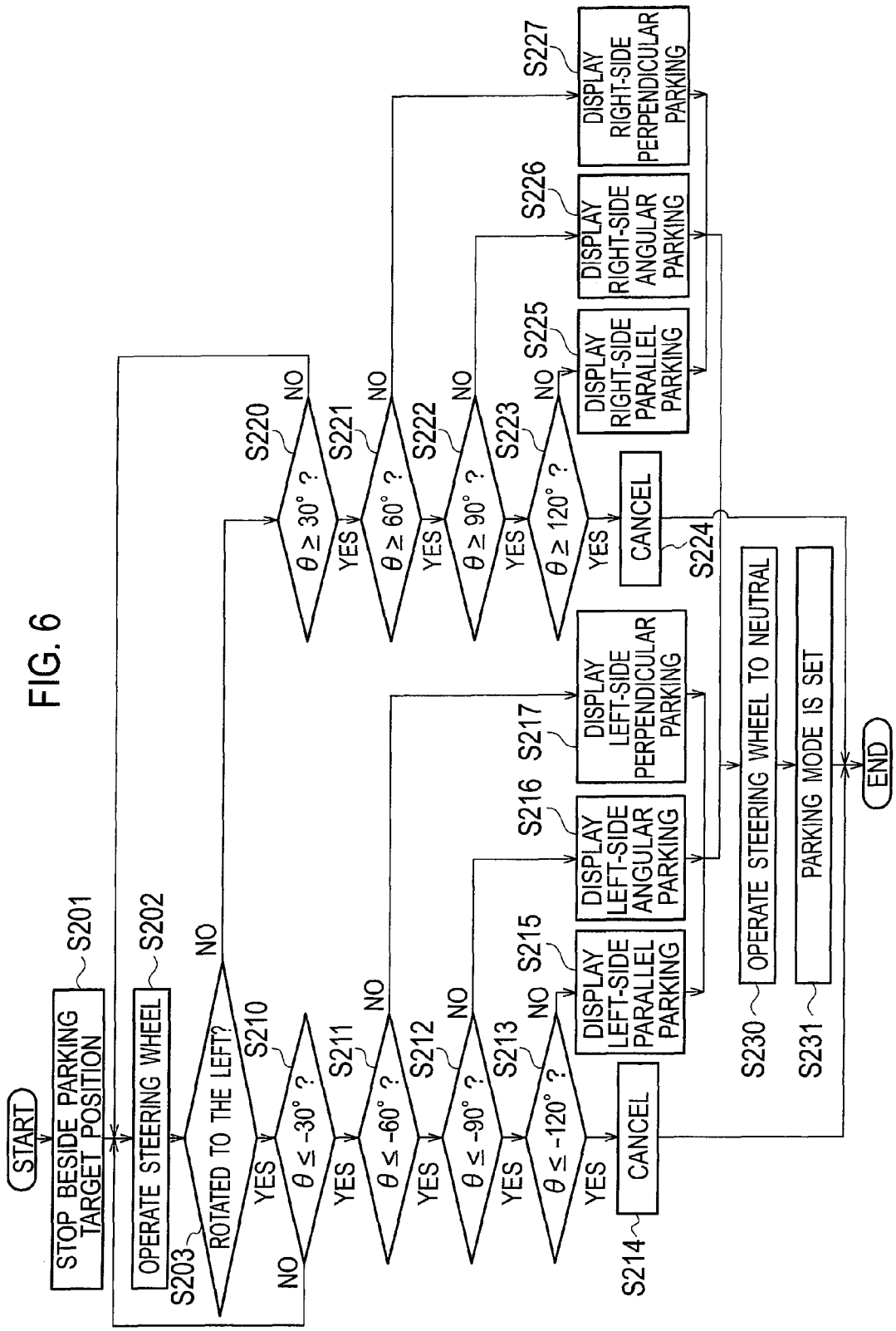
FIG. 6 It is a flowchart showing a parking mode selection process.

As shown in FIG. 6, a driver stops a vehicle beside a parking target position (step S201). At this time, an initially-displayed screen 701 in FIG. 7 is displayed on the display 7. In the initially-displayed screen 701, total six parking modes, a perpendicular parking, a parallel parking and an angular parking each on right and left sides are displayed. Subsequently, the driver starts steering to select a parking mode (step S202). Here, it is assumed that a steering wheel is steered from almost its neutral state. In addition, a steer angle θ of the steering wheel is defined so that its clockwise rotation (steer to the right) is plus and its counter-clockwise rotation (steer to the left) is minus.

Subsequently, it is judged whether or not the steering wheel is rotated to the left (step S203). When the steering wheel is rotated to the left, processes for displaying left-side parking modes that are changed over according to the steer angel are executed (steps S210 to S217). A case in which the steering wheel is rotated to the right will be explained later. When the step S203 is affirmative, it is judged whether or not the steer angle is equal-to or smaller-than −30° (step S210). When the steer angle is larger than −30° (NO in the step S210), its process flow returns to the step S202.

On the other hand, when the steer angle is equal-to or smaller-than −30° (YES in the step S210), it is judged whether or not the steer angle is equal-to or smaller-than −60° (step S211). When the steer angle is larger than −60° (NO in the step S211), i.e. within a steer angle range −30° to −60°, it is judged that a left-side perpendicular parking is selected and thereby a left-side perpendicular parking position (parking mode) is displayed on the display 7 in a selected state (step S217: screen 705 in FIG. 7).

Figure 7:
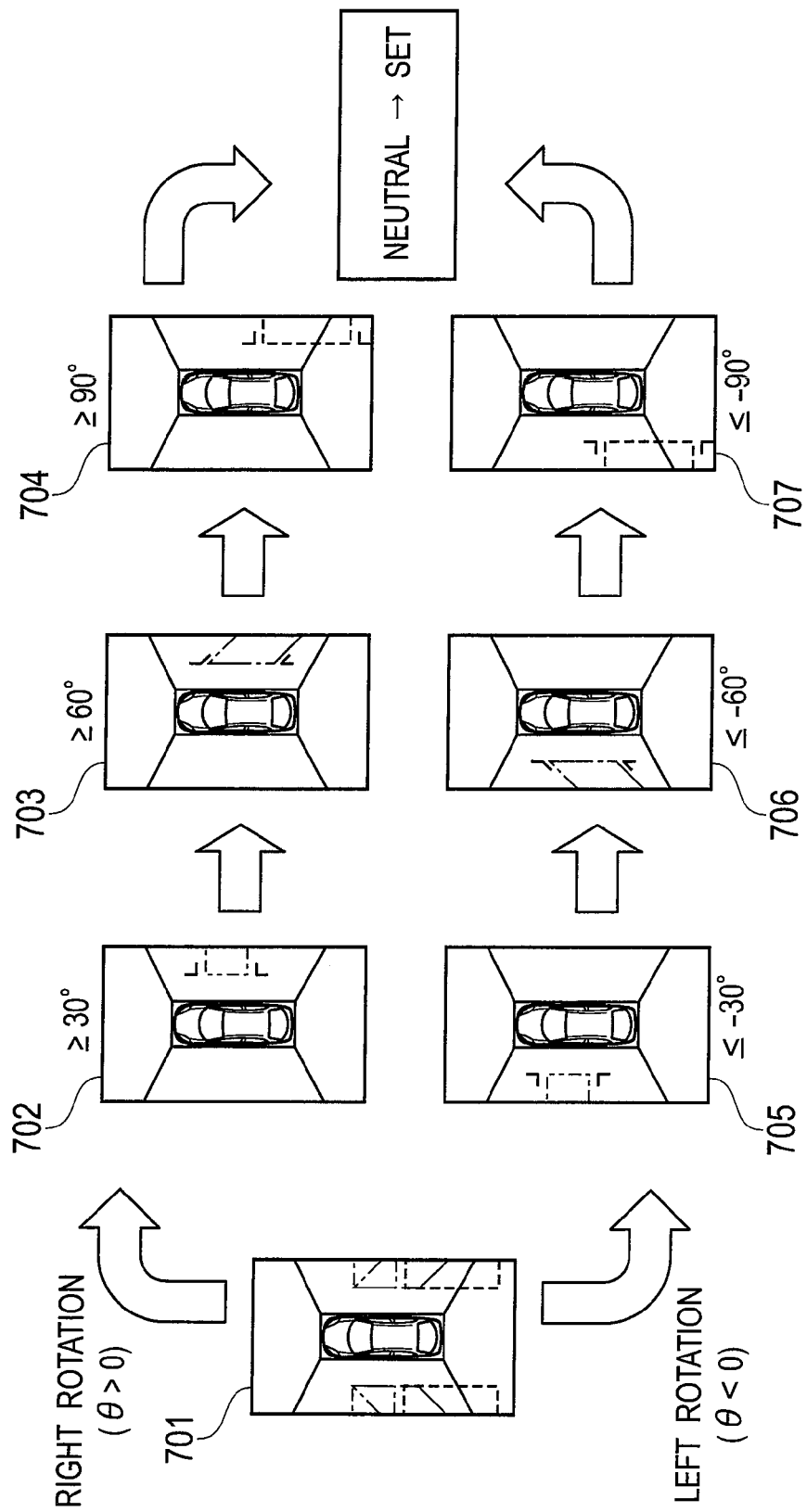
FIG. 7 It is a diagram for explaining correspondence between steer angles and displayed screens (parking modes).
Figure 8:
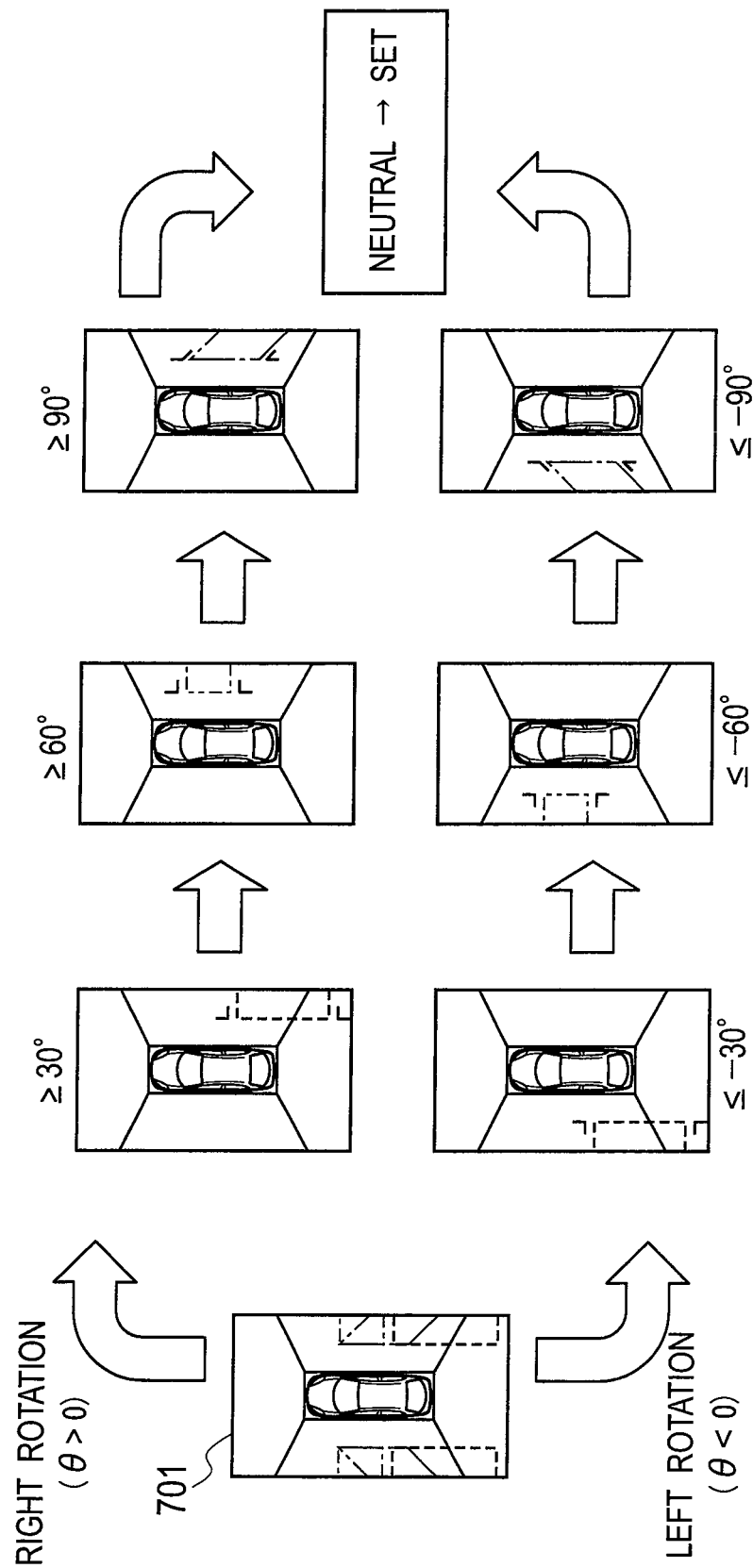
FIG. 8 It is a diagram for explaining other correspondence between steer angles and displayed screens (parking modes).

Similarly, within a steer angle range −60° to −90° (NO in the step S212), it is judged that a left-side angular parking is selected and thereby a left-side angular parking position (parking mode) is displayed on the display 7 in a selected state (step S216: screen 706 in FIG. 7). In addition, within a steer angle range −90° to −120° (NO in the step S213), it is judged that a left-side parallel parking is selected and thereby a left-side parallel parking position (parking mode) is displayed on the display 7 in a selected state (step S215: screen 707 in FIG. 7). Note that, when the steer angle is equal-to or smaller-than −120° (YES in the step S213), it is judged that the parking mode selection is cancelled (step S214) and thereby the parking mode selection process is finished.

Contrarily, when it is judged that the steering wheel is rotated to the right (NO in the step S203), a selection process for right-side parking modes is executed similarly to the above-explained selection process for the left-side parking modes (steps S220 to S227: screens 702 to 704 in FIG. 7).

Since a parking mode is set with associated with the steer angle ranges as explained above, when the steer angle enters into a predetermined steer angle range and thereby, a parking target position (parking mode) associated with the steer angle is selected. In addition, a left-side parking target position (parking mode) is selected by a leftward rotation of the steering wheel in the steps S203 to S217, and a right-side parking target position (parking mode) is selected by a rightward rotation of the steering wheel in the steps S220 to S227. Therefore, since a rotational direction of the steering wheel coincides with a parking target position (parking mode) to be selected, it is easy to select a parking target position (parking mode).

After the parking target position (parking mode) is selected as explained above, the steering wheel is returned to its neutral position (step S230) to set the selected parking mode (step S231), and then the parking mode selection process is finished.

The driver rotates the steering wheel to change the displayed screens 702 to 707 in FIG. 7, and rotates the steering wheel backward to the neutral position when a desired parking mode coincides with the displayed screen. When the steering mode is returned close to the neutral position, the parking mode is set.

Note that, although a parking mode is displayed in an order of a perpendicular parking, an angular parking and then a parallel parking in the example shown in FIG. 7, the order may be changed. For example, frequencies of parking modes are preliminarily measured, and parking modes may be displayed in an order from a parking mode having the highest frequency. In an example shown in FIG. 8, it is assumed that a parallel parking has the highest frequency, and a parallel parking is displayed within a steer angle range 30° to 60° (−30° to −60°), a perpendicular parking is displayed within a steer angle range 60° to 90° (−60° to −90°), and an angular parking is displayed within a steer angle range 90° to 120° (−90° to −120°). According to this change, operational amount of the steering wheel can be reduced, so that convenience can be improved.

Figure 9:
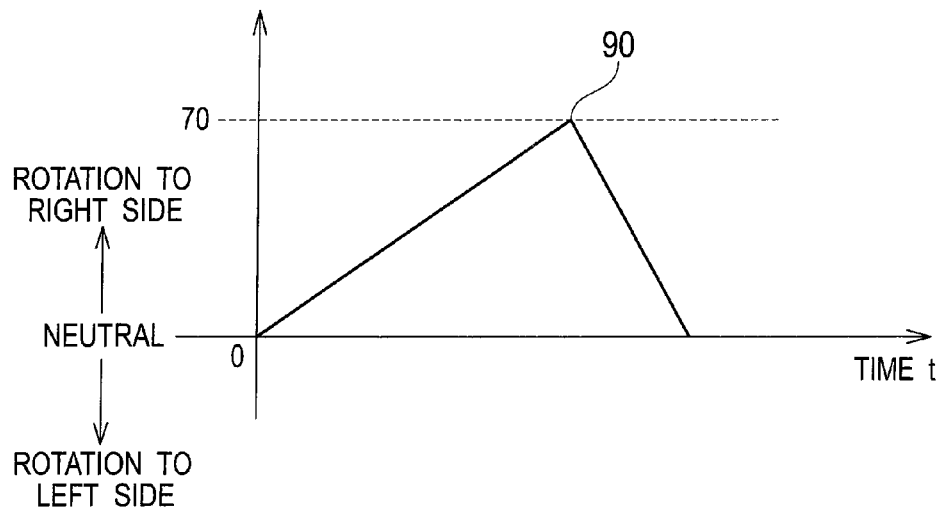
FIG. 9 It is a graph showing relation of steer angle and time.

A graph shown in FIG. 9 shows a relation between a steer angle θ and time during a parking mode selection, its horizontal axis is time t from a start of a rotation of the steering wheel and its vertical axis is a steer angle θ. A shown in FIG. 9, the steering wheel is rotated to the right by 70° and then returned to the neutral position in this example. In this case, the displayed screen is changed from the initially-displayed screen 701 to the screens 702 and 703 shown in FIG. 7, and then the steering wheel is returned to the neutral position while the screen 703 to set a parking mode. The displayed screen when the steering wheel is returned to the neutral position is still the screen 703. Note that, although a parking mode is set when the steering wheel is returned to the neutral position in the above case, a parking mode may be set, for example, at a time when it is started to rotate the steering wheel backward to the neutral position, i.e. at a point 90 in FIG. 9. In any case, a parking mode is set by an operation of returning the steering wheel to the neutral position.

Figure 10:
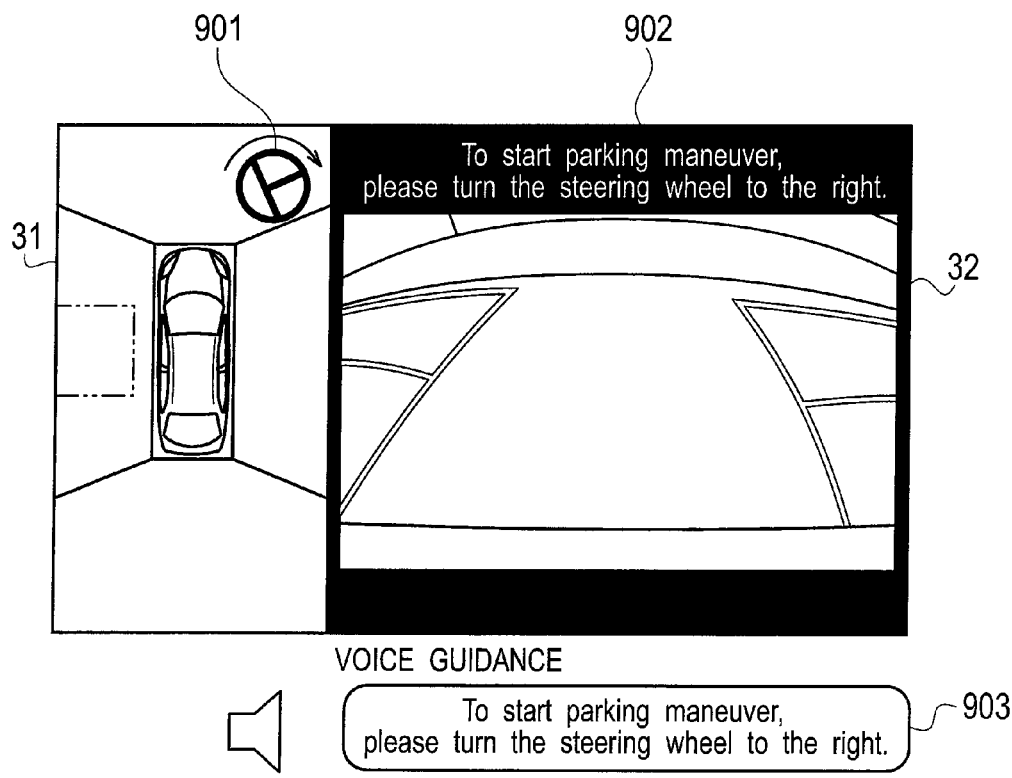
FIG. 10 It is a diagram sowing a displayed screen example.

In addition, a display screen or voice guidance for prompting to return the steering wheel to the neutral position may be output. FIG. 10 shows a display screen example and a voice guidance example in a case where a left-side perpendicular parking is selected. As shown in FIG. 10, it may be done to display an icon 901 in a top view movie 31 displayed on the display 7 and display a sentence 902 near a take image 32 (only one of them may be displayed) in order to prompt a driver to rotate the steering wheel rightward. Further, it may be done to output a guidance "To start parking maneuver, please turn the steering wheel to the right" as shown as a voice guidance 903. The display screen and a voice guidance may be used concurrently or alternatively. FIG. 10 shows an example where a left-side perpendicular parking is selected and a rightward rotation of the steering wheel is prompted, but a leftward rotation of the steering wheel will be prompted in a case where a right-side parking mode is selected.

Further, the driver may clearly recognize the parking mode by ringing a chime for presenting that the parking mode is set or displaying a screen of a guidance "Parking mode is set" when the steering wheel is returned to the neutral position and thereby the parking mode is set.

In addition, even when the steering wheel is returned to the neutral position and thereby the parking mode is set, a parking mode selection (setting) can be redo by rotating the steering wheel again. Therefore, even when setting an undesired parking mode or when wanting to change the parking mode after it has been set.

[Advantages According to First Embodiment]

According to the parking mode selection apparatus in the above-explained first embodiment, a drive can clearly recognize a parking mode through his/her own operation and an easy operation can be brought, because the driver can set the parking mode together with a parking target position by his/her own steering operation.

In addition, since a parking mode is selected according to steer angle ranges of a steering wheel, a driver can select a parking mode only by rotating the steering wheel and thereby operability can be improved.

In addition, since a parking mode is set by an operation of a steering wheel to the neutral position after a parking mode has been selected, a driver can clearly recognize a set of a parking mode through his/her own operation.

In addition, since parking modes include a perpendicular parking, a parallel parking and an angular parking each on right and left sides and a rotational direction of a steering wheel coincides to a parking target position (a parking mode) when selecting the parking mode, a driver can easily recognize the parking mode.

In addition, since a steer angle range for a perpendicular parking, a steer angle range for an angular parking and a steer angle range for a parallel parking are allocated sequentially from a near side of a neutral position, parking modes are displayed in sequence from parking target positions (pa-king modes) close to a driver's seat when rotating a steering wheel (i.e. they are displayed in an order that doesn't give a feeling of strangeness by continuously changing an after-explained parking frame angle ω (see FIG. 20)). Therefore, parking modes are displayed in an order that fits with a driver's sensibility, so that operability can be improved.

In addition, an operational amount of a steering wheel can be reduced when selecting a parking mode by allocating a parking mode with a higher parking frequency at a nearer side of a neutral position. The parking frequencies may be updated cased on an execution history of the parking assistance control.

In addition, since a display screen or a voice guidance for prompting to return a steering wheel to the neutral position when setting a parking mode after a parking mode has been selected, a driver can clearly recognize an operation to return the steering wheel to the neutral position.

Second Embodiment

Next, a second embodiment will be explained with reference to FIGS. 11 to 14. Note that configurations identical or similar to those in the above-explained first embodiment are labeled with identical numerals, and their detailed explanations are omitted.

[Configuration of Parking Assistance Apparatus]

Figure 11:
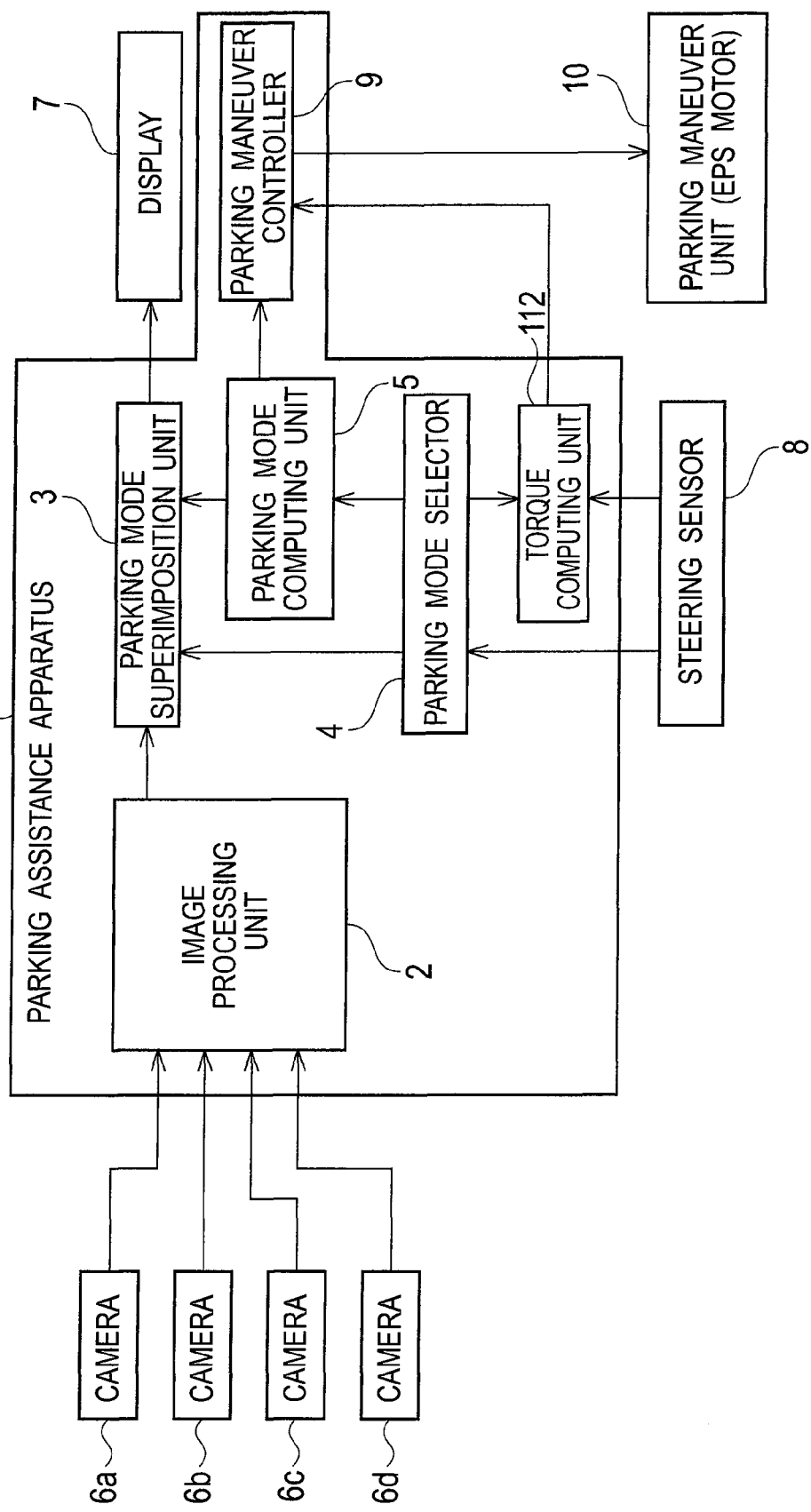
FIG. 11 It is a block diagram showing a configuration of a parking mode selection apparatus according to a second embodiment.
Figure 12:
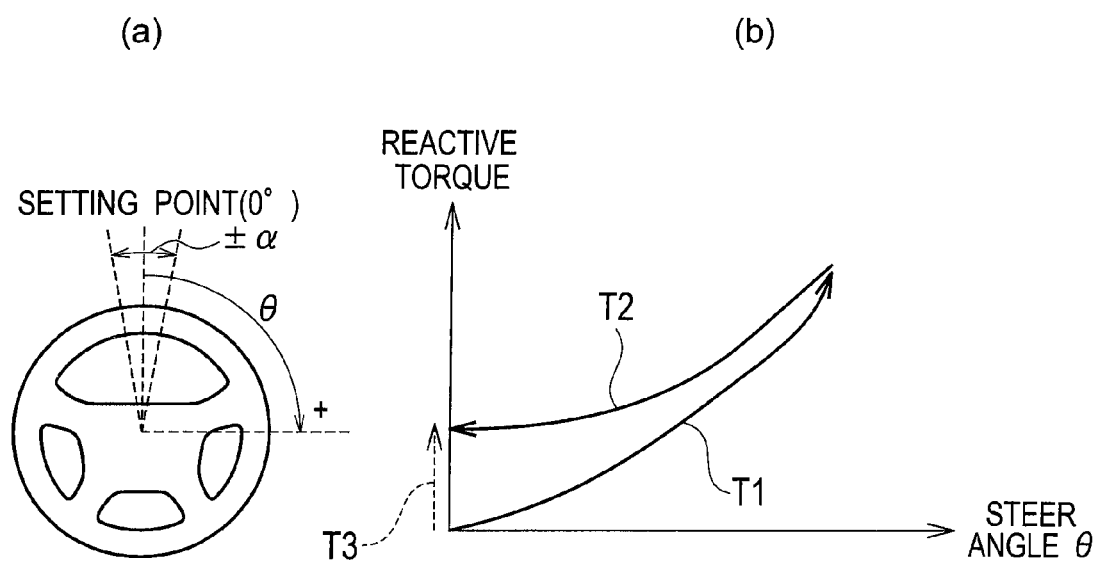
FIG. 12(a) is a front view showing a steer angle of a steering wheel, and (b) is a graph showing relation of steer angle and reactive torque.

As shown in FIG. 11, a parking assistance apparatus 111 according to the present embodiment further includes a torque computing unit 112 that computes torque for returning a steering wheel to the neutral position.

In a case where a steering wheel is returned to the neutral position after road wheels have been steered by rotating the steering wheel from a stop state, a steering system may move by it self due to residual distortion energy of tires when leaving hands from the steering wheel, so that the steering wheel may rotate by itself. If a steer angle θ comes out of a parking mode setting range (−α<θ<α) near the neutral position by this rotation, the parking mode that has been set is cancelled and it is subject to go into an operation for selecting a parking mode. Therefore, the torque computing unit 112 computes a torque value for returning the steering wheel to the neutral position (for making a steer angle θ to 0°) based on a steer angle detected by the steering sensor 8 during a parking mode selection process mainly in order to prevent the rotation of the steering wheel caused by the residual distortion energy. The computed torque value is out put to the parking maneuver unit (EPS motor) 10 via the parking maneuver controller 9. The parking maneuver unit (EPS motor) 10 prevents the rotation of the steering wheel due to the residual distortion energy by generating torque of the computed torque value. Here, the parking maneuver unit (EPS motor) 10 functions as a torque generator.

[Torque Computing Process]

Next, a torque value computing process by the parking mode selection apparatus 111 will be explained. The torque value computing process and the above-explained parking mode selection process (see FIG. 6) are executed in parallel.

In the torque computing process, a torque toward the neutral position (reactive torque T1-T3 shown in FIG. 12(b): torque in a counter-clockwise direction) is computed by the torque computing unit 112 if a steer angle changes due to a driver's steering operation. For example, as shown in FIG. 12(b), in a case where a steer angle θ increases (clockwise steering operation), a counter-clockwise torque (reactive torque T1>0) that generates a steering reaction force against a rotation of a steering wheel is applied. Here, the reactive torque T1 that becomes larger along with an increase of the steer angle θ is applied, so that a driver can recognize a steer amount easily. This reactive torque T1 is continuously applied while the steering wheel is being rotated in a clockwise direction during the parking mode selection.

Subsequently, when the driver steers the steering wheel to the neutral position after selecting a parking mode in order to set the parking mode, a counter-clockwise torque (reactive torque T2>0) larger than the reactive torque T1 is applied. This reactive torque T2 promotes a return of the steering wheel to the neutral position. After the return to a range (−α<θ<α) close to the neutral position, a torque (reactive torque T3) toward the neutral position is applied in order to restrict the rotation of the steering wheel to the outside from the parking mode setting range due to the residual distortion energy. Since the magnitude of this reactive torque T3 generally changes due to a maximum value of the steer angle θ, an adequate reactive torque T3 is computed by storing the maximum value of the steer angle θ during the parking mode selection.

Next, the above-explained torque value computing process will be explained with reference to a flowchart shown in FIG. 13.

Figure 13:
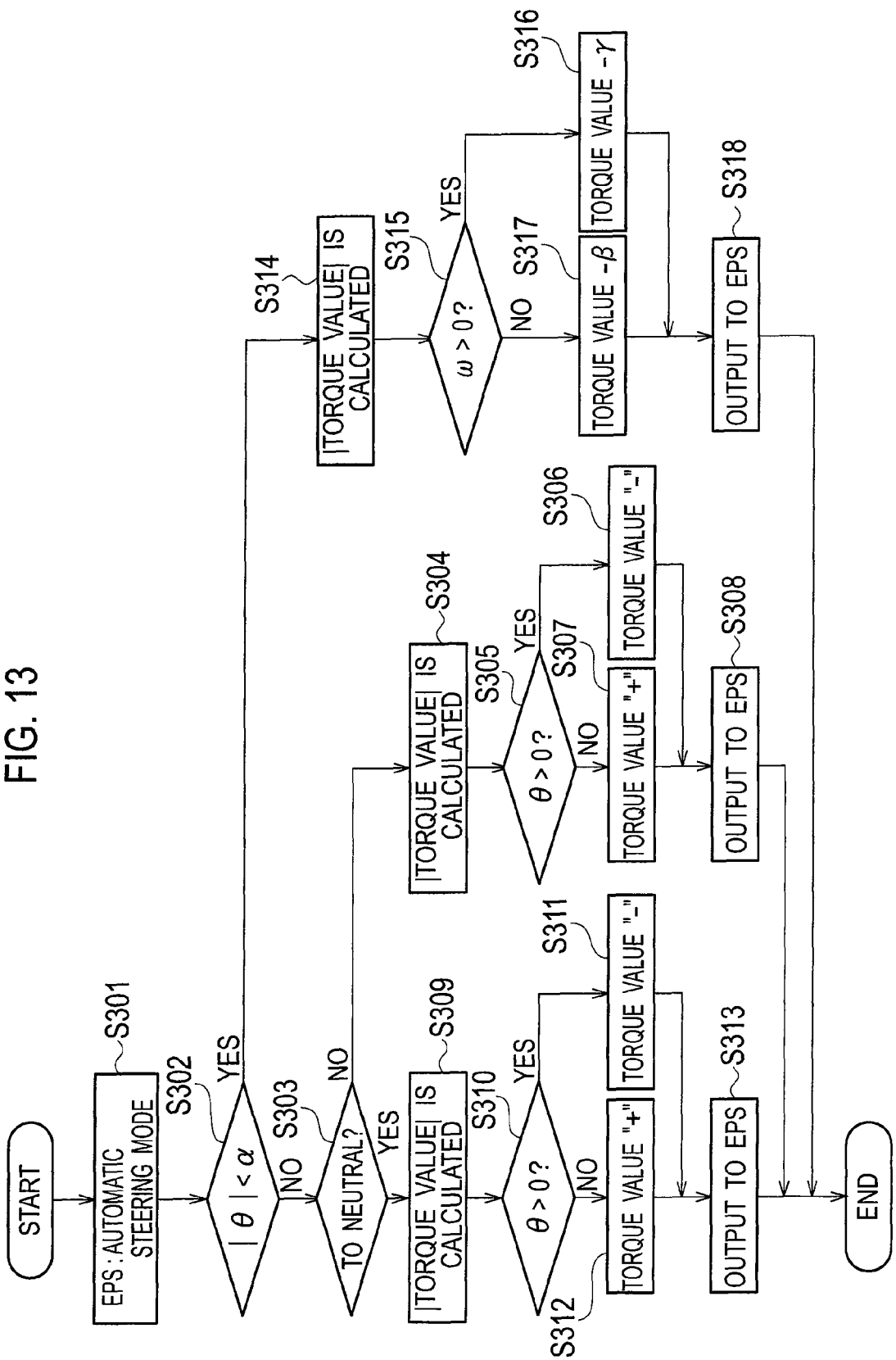
FIG. 13 It is a flowchart showing a torque value calculation process.

As shown in FIG. 13, an EPS system is shifted from a normal mode to an automatic steering mode (step S301). The automatic steering mode is, unlike the normal mode, a mode in which the EPS motor 10 is controlled to generate a torque computed through the torque computing process.

Subsequently, it is judged whether or not the steer angle θ is in the range (−α<θ<α) close to the neutral position (step S302). If the steer angle θ is in the outside of the parking mode setting range (NO in step S302), it is judged whether or not it is steered toward the neutral position (step S303). If it is steered so as to be distanced away from the neutral position (NO in step S303), a preset table or the like is retrieved and then a torque value corresponding to an absolute value of the reactive torque T1 (see FIG. 12(b)) is computed (step S304).

Subsequently, it is judged whether or not the steer angle θ is larger than zero, i.e. whether or not the steering wheel is being rotated in a clockwise direction (step S305). If the steer angle θ is larger than zero (YES in step S305), a sign of the computed torque value is set to minus (step S306), because the steering wheel is being rotated in a clockwise direction. In other words, the computed minus torque value corresponds to the reactive torque T1 (>0: in a counter-clockwise direction) toward the neutral position. On the other hand, if the steering wheel is being rotated in a counter-clockwise direction (NO in step S305), a sign of the computed torque value is set to plus (step S307), because the steering wheel is being rotated in a counter-clockwise direction. In other words, the computed plus torque value corresponds to the reactive torque T1 (<0: in a clockwise direction) toward the neutral position. The computed torque value is output to the EPS motor 10 as a torque command value.

On the other hand, if it is steered toward the neutral position (YES in step S303), a torque value (of the reactive torque T2) is computed and then output to the EPS motor 10 as a torque command value through steps S309 to S313, similarly to the above-explained steps S304 to S308.

Note that, if the steer angle θ is in the parking mode setting range (−α<θ>α) (YES in step S302), a torque value corresponding to the above-explained reactive torque T3 is computed in order to prevent the steering wheel from being rotated from the neutral position by the residual distortion energy. Firstly, a preset table or the like is retrieved and then a torque value is computed based on the maximum steer angle θmax (and its steered direction Pmem) during the parking mode selection (step S314).

Here, a storing process for the maximum steer angle θmax (>0: absolute angle value) during the parking mode selection and its stored sign Pmem (plus or minus: steered direction), and a torque value computing process in the step S314 will be explained with reference to a flowchart shown in FIG. 14. As explained above, the torque caused by the residual distortion energy changes according to the maximum value of the steer angle θ during the parking mode selection. Therefore, an adequate torque value can be computed by storing the maximum value of the steer angle θ, i.e. the maximum steer angle θmax (and its steered direction Pmem).

Figure 14:
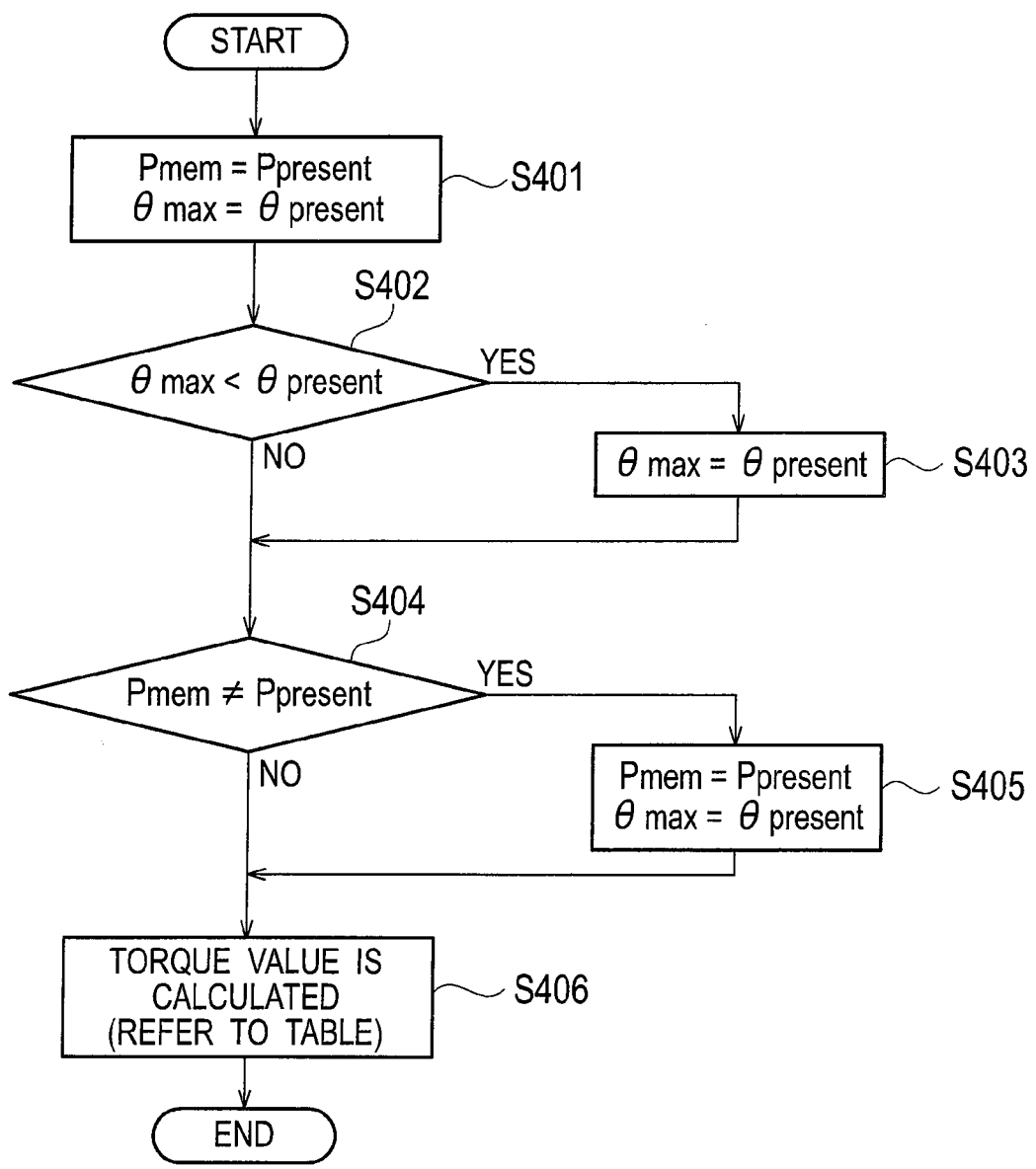
FIG. 14 It is a flowchart showing a maximum torque value storing process.

As shown in FIG. 14, firstly, a current sign (plus or minus) Ppresent of the steer angle θ is stored as the stored sign Pmem, and a current steer angle θpresent is stored as the maximum steer angle θmax (step S401). The current steer angle θpresent and the current sign Ppresent are detected by the steering sensor 8, and the maximum steer angle θmax and the stored sign Pmem is stored in the parking mode computing unit 5 via the parking mode selector 4.

Subsequently, it is judged whether or not the current steer angle θpresent is larger than the stored maximum steer angle θmax (step S402). If the current steer angle θpresent is not larger than the stored maximum steer angle θmax (NO in step S402), the process flow proceeds to step S404 without any change, because the maximum value of the steer angle θ is not updated. On the other hand, if the current steer angle θpresent is larger than the stored maximum steer angle θmax (YES in step S402), the maximum steer angle θmax is updated with the current steer angle θpresent (step S403), because the maximum value of the steer angle θ has been updated.

Subsequently to the steps S402 and S403, it is judged whether or not the current sign Ppresent coincides with the stored sign Pmem, i.e. whether or not a current steered direction is different form a previously-stored value (step S404). If the current sign Ppresent coincides with the stored sign Pmem (NO in step S404), the process flow proceeds to step S406 without any change, because the steered direction didn't change. On the other hand, if the current sign Ppresent doesn't coincide with the stored sign Pmem (YES in step S404), the stored sign Pmem is updated with the current sign Ppresent and the stored maximum steer angle θ is updated with the current steer angle θpresent (step S405), because the steered direction has changed.

Subsequently to the steps S404 and S405, a preset table or the like is retrieved and a torque value is computed based on the maximum steer angle θmax and the stored sign Pmem (step S406), and thereby the torque value computing process is finished.

Note that, since an applied direction of the residual distortion energy is reset when a steered direction has changed, the stored sign Pmem and the maximum steer angle θmax are both updated in a case where the step S404 is affirmative. Here, although the judgment in the step S402 is made only based on the steer angle θ (>0: absolute value) regardless of whether or not the current steered direction is different from the previously stored value, it is not problematic because the stored sign Pmem and the maximum steer angle θmax are both updated according to the judgment results for the steered angle in the following step S404. In addition, for example, in a case where only the maximum value of the steer angle θ is updated without a change of the steered direction, the process flow proceeds: YES in step S402→step S403 (only the maximum steer angle θmax is updated)→NO in step S404→step S406.

The explanation of the flowchart shown in FIG. 13 will be continued. When the torque value is computed in the step S314, it is judged whether or not an angular velocity ω of the steer angle θ is larger than zero, i.e. which direction the steering wheel is being rotated to (step S315). If the angular velocity ω is larger than zero (YES in step S315), set is a plus torque value (the reactive torque T3 having a minus value) whose tendency of a counter-clockwise direction is strengthen by subtracting a margin γ (>0) from the torque value computed in the step S314 (step S316) because the steering wheel is being rotated toward the neutral position in a clockwise direction. On the other hand, if the angular velocity ω is not larger than zero (NO in step S315), set is a minus torque value (the reactive torque T3 having a plus value) whose tendency of a clockwise direction is strengthen by adding a margin β (>0) to the torque value computed in the step S314 (step S317) because the steering wheel is being rotated toward the neutral position in a counter-clockwise direction. Note that the margins β and γ may be preset so as to have an identical value. The set value is output to the EPS motor 10 as the torque command value.

[Advantages According to Second Embodiment]

According to the parking mode selection apparatus in the above-explained second embodiment, the rotation of the steering wheel caused by the residual distortion energy of tires can be restricted and a parking mode can be surely set, because a torque for rotating toward the neutral position is applied.

Third Embodiment

Next, a third embodiment will be explained with reference to FIGS. 15 and 16. Note that configurations identical or similar to those in the above-explained first and second embodiments are labeled with identical numerals, and their detailed explanations are omitted.

Figure 15:
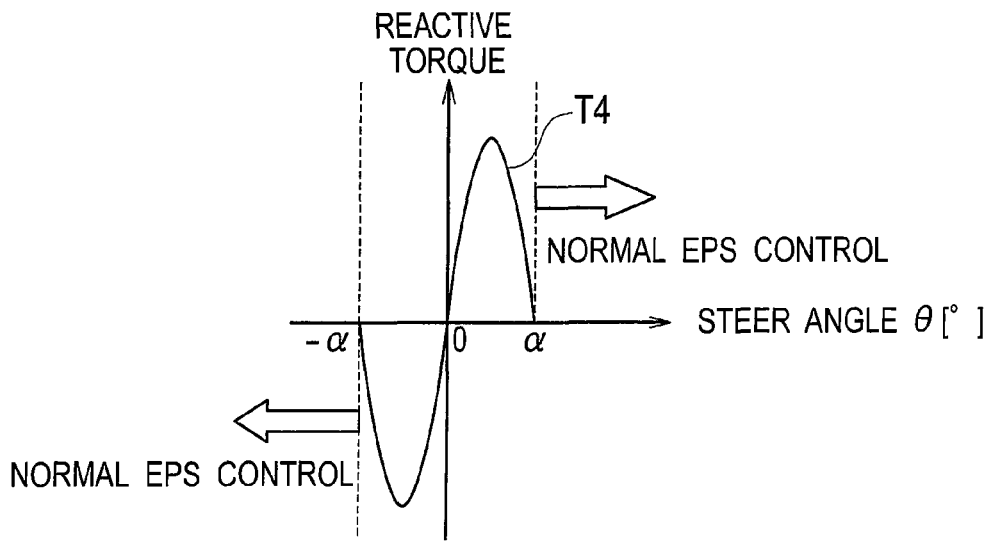
FIG. 15 It is a graph showing relation of steer angle and reactive torque in a parking mode selection apparatus according to a third embodiment.

In the present embodiment, as shown in FIG. 15, a torque toward the neutral position (reactive torque T4) is applied only when the steer angle θ is within the parking mode setting range ($-\alpha<\theta<\alpha$) in the vicinity of the neutral position. On the other hand, the EPS system is controlled in a normal mode when the steer angle θ is outside the parking mode setting range ($-\alpha<\theta<\alpha$).

For example, as shown in FIG. 15, a counter-clockwise torque (a reactive torque having a plus value) is applied in the range $-\alpha<\theta<\alpha$. A driver can get a moderate reactive feel by this torque, so that the steer angle θ can become held at the neutral position (θ=0°). In addition, the above-explained rotation of the steering wheel caused by the residual distortion energy can be restricted by this torque. A maximum value of this reactive torque T4 is set to a value that gives a driver a moderate reactive feel without impeding a driver's steering operation and can restricts the rotation of the steering wheel caused by the residual distortion energy. Then, in the range $-\alpha<\theta<\alpha$, a steering operation during the parking mode selection is controlled by a normal power steering control. Also in a range θ<0, a similar control is executed symmetrically.

Next, the above-mentioned torque value computing process will be explained with reference to a flowchart shown in FIG. 16.

Figure 16:
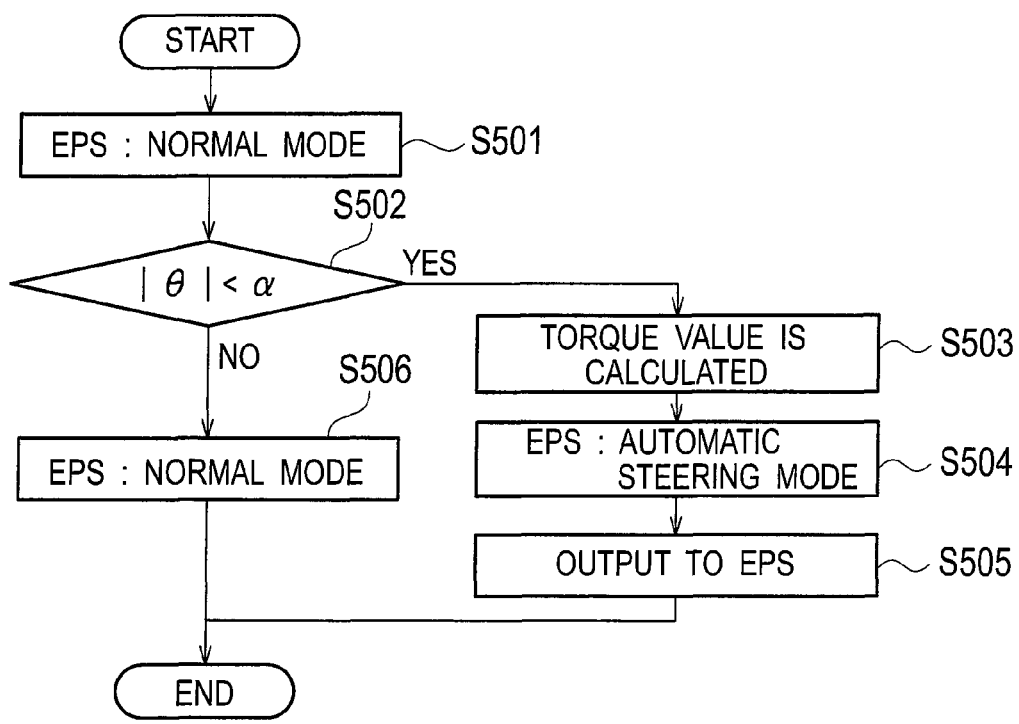
FIG. 16 It is a flowchart showing a torque value calculation process.

As shown in FIG. 16, generally, the EPS system is controlled in a normal mode (step S501). It is judged whether or not the steer angle θ is in the inside of the parking mode setting range (−α<θ<α) (step S502). If the steer angle θ is not in the inside of the parking mode setting range (−α<θ<α) (NO in step S502), the normal mode is maintained (step S506), and then the torque value computing process is finished.

On the other hand, the steer angle θ is in the inside of the parking mode setting range (−α<θ<α) (YES in step S502), a preset table or the like is retrieved and then a torque value toward the neutral position (reactive torque T4) is computed (step S503). Subsequently, the EPS system is system is shifted from a normal mode to an automatic steering mode (step S504), and the computed torque value is output to the EPS motor 10 as a torque command value (step S505).

[Advantages According to Third Embodiment]

According to the parking mode selection apparatus in the above-explained third embodiment, since the torque toward the neutral position (reactive torque) is applied only when the steer angle θ is in a predetermined range in the vicinity of the neutral position, it is possible to give a driver a moderate reactive feel in the above range, and to give a driver a natural feel by a normal power steering control outside the above range.

Fourth Embodiment

Figure 17:
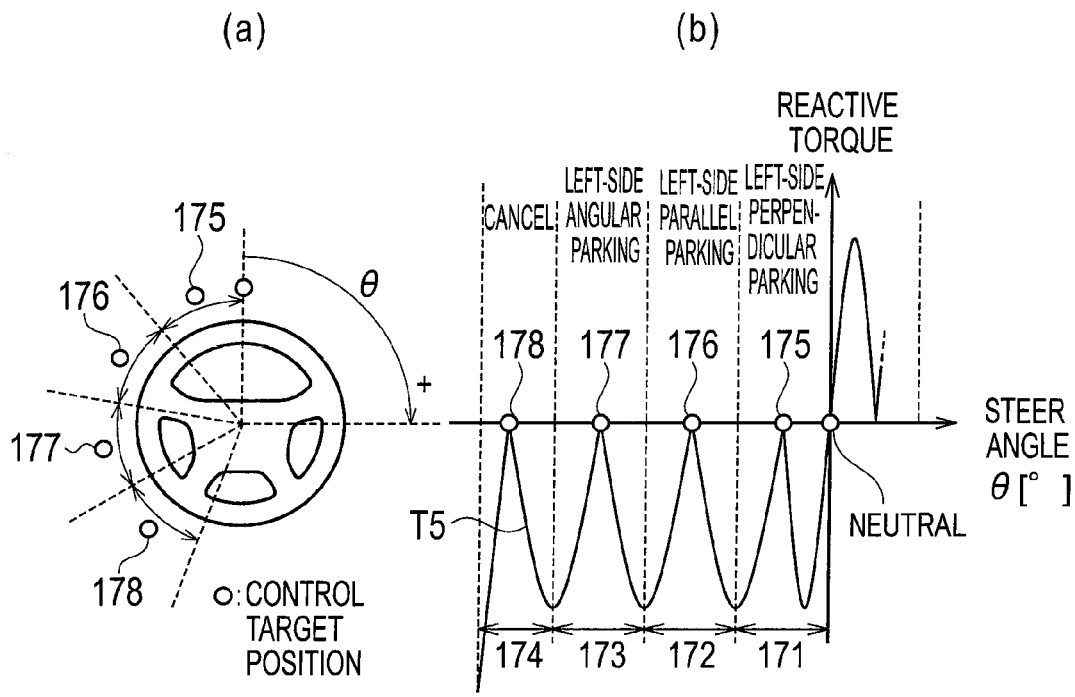
FIG. 17(a) is a front view showing a steer angle of a steering wheel and control target positions, and (b) is a graph showing relation of steer angle and reactive torque in a parking mode selection apparatus according to a fourth embodiment.

Next, a fourth embodiment will be explained with reference to FIGS. 17(a) to 18. Note that configurations identical or similar to those in the above-explained first to third embodiments are labeled with identical numerals, and their detailed explanations are omitted.

In the present embodiment, as shown in FIGS. 17(a) and 17(b), target positions 175 to 178 are set at centers of steer angle ranges 171 to 174, respectively. Then, as shown in FIG. 17(b), during rotating of the steering wheel for the parking mode selection, a torque toward the neutral position (reactive torque T5) is applied so as to increase a reactive feel felt by a driver when passing through each of the target positions 175 to 178. In addition, this reactive feed is reduced at each fore side of the target positions 175 to 178, so that the next target position 175 to 178 is made easily selectable. Note that, although only a leftward steering operation is shown in FIG. 17(b), a similar control is made symmetrically for a rightward operation.

The torque toward the neutral position is applied by applying the reactive torque T5 during the parking mode selection in the vicinity of the neutral position similarly to the above third embodiment, and, outside the vicinity of the neutral position, a reactive feel is increased when passing through each of the target positions 175 to 178 and a torque is applies so as to reduce the reactive feel at each fore side of the target positions 175 to 178. As a result, the steer angle θ can become held at each of the target positions 175 to 178. Therefore, it is possible to give a driver a moderate reactive feel, and operability is improved because the steer angle ranges 171 to 174 become easily selectable.

Note that the outermost range 174 is a rage for canceling the parking mode and the reactive torque T5 is precipitously increased after passing through its target position 178. Since a driver's reactive feel is precipitously increased after passing through the target position 178, an unnecessary steering operation (excessive rotation) by a driver can be prevented. In addition, the reactive torque T5 gives a driver a reactive feel during the parking mode selection, and promotes a return to the neutral position when returning the steering wheel to the neutral position after the parking mode has been selected.

Next, the above-mentioned torque value computing process will be explained with reference to a flowchart shown in FIG. 18.

Figure 18:
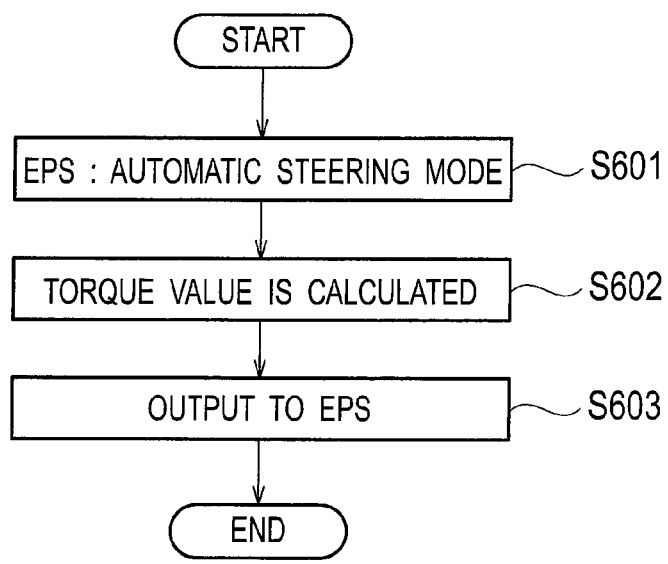
FIG. 18 It is a flowchart showing a torque value calculation process.

As shown in FIG. 18, the EPS system is shifted from a normal mode to an automatic steering mode (step S601). Subsequently, a preset table or the like is retrieved and then a torque value toward the neutral position (reactive torque T5) as shown in FIG. 17(b) is computed based on the steer angle θ detected by the steering sensor 8 and the table (step S602). Then, the computed torque value is output to the EPS motor 10 as a torque command value (step S603).

[Advantages According to Fourth Embodiment]

According to the parking mode selection apparatus in the above-explained fourth embodiment, target positions are at centers of steer angle ranges for the parking modes, respectively, and a torque toward the neutral position (reactive torque) is applied when the steer angle is shifted from the target positions. Therefore, the steer angle can become held at each of the target positions while giving a driver a moderate reactive feel during the parking mode selection, and thereby operability of the parking mode selection can be improved.

Fifth Embodiment

Next, a fifth embodiment will be explained with reference to FIGS. 19 to 24. Note that configurations identical or similar to those in the above-explained first to fourth embodiments are labeled with identical numerals, and their detailed explanations are omitted. In the present embodiment, displayed is a top view movie 31 that enables an advanced selection of a parking angle when selecting a parking mode such as an angular parking and a parallel parking.

[Parking Mode Selection Process]

Figure 19:
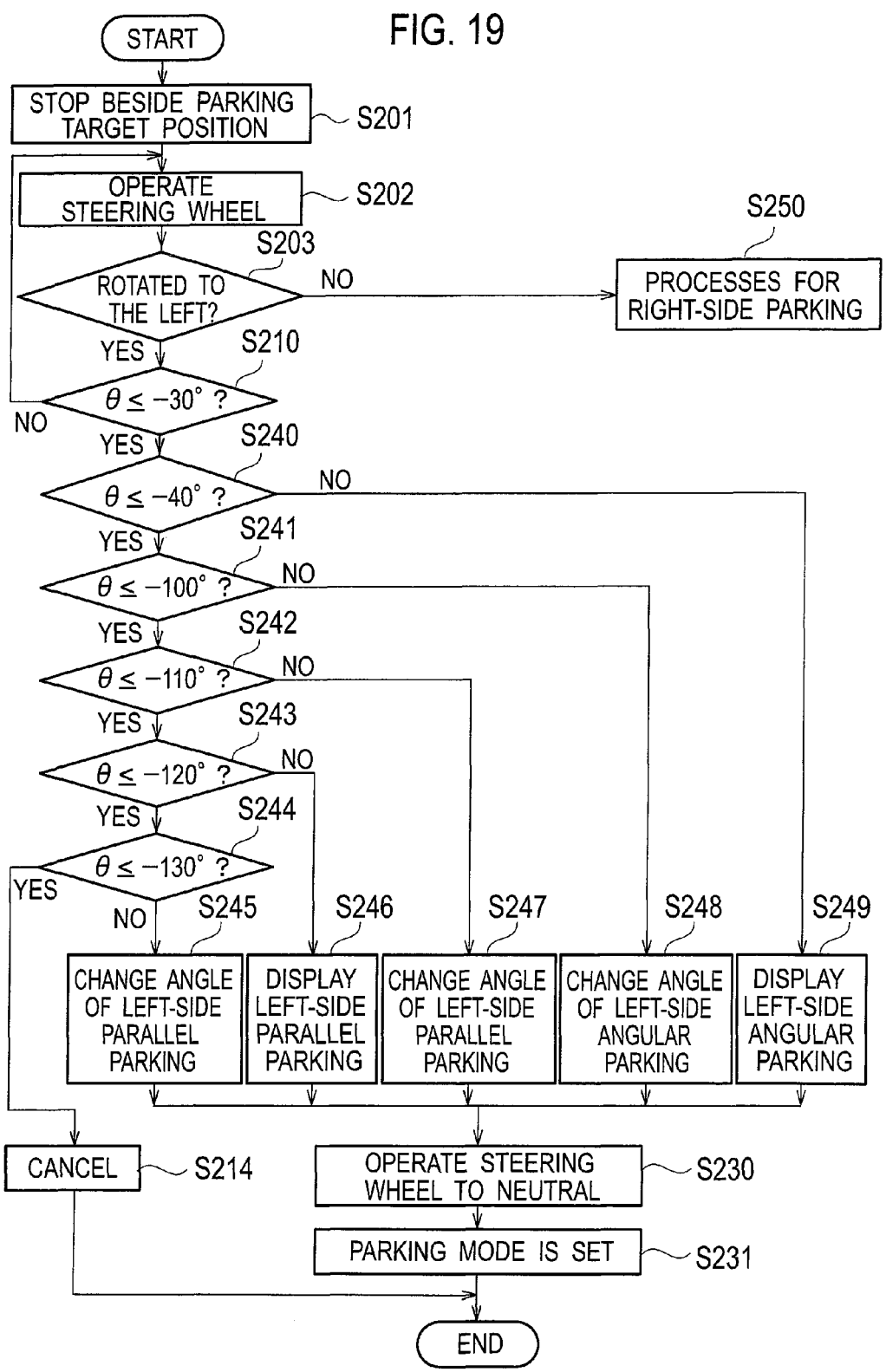
FIG. 19 It is a flowchart showing a parking mode selection process by a parking mode selection apparatus according to a fifth embodiment.
Figure 20:
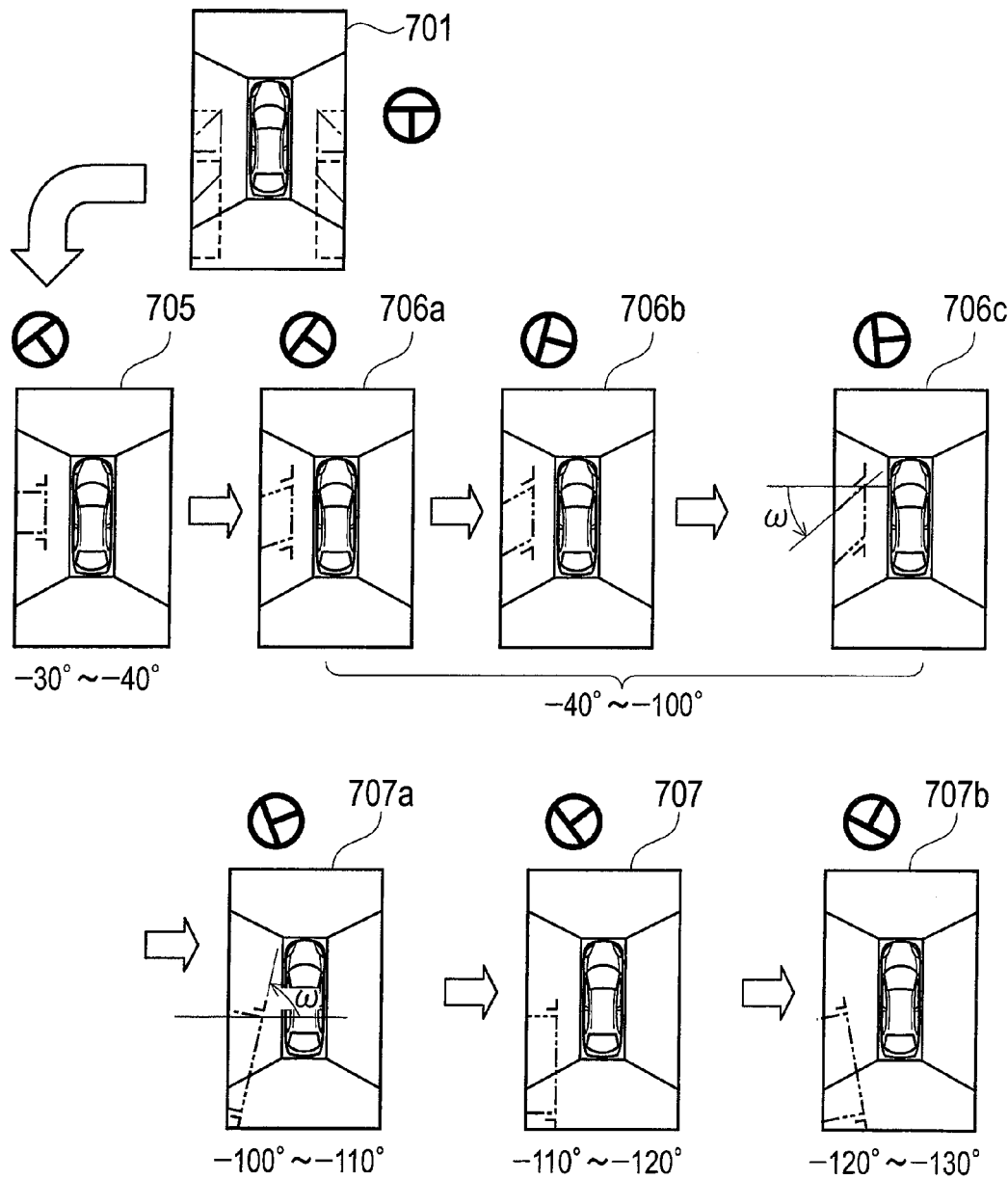
FIG. 20 It is a diagram for explaining correspondence between steer angles and displayed screens (parking modes).

In the present embodiment, a parking mode selection process shown in FIG. 19 is executed as substitute for the parking mode selection process shown in FIG. 6 in the first embodiment. Configurations of a parking mode selection apparatus 1 in the present embodiment are identical to those in the first embodiment. The parking mode selection process by the parking mode selection apparatus 1 according to the present embodiment will be explained with reference to a flow chart shown in FIG. 19 and displayed screen examples of a top view movie shown in FIG. 20. In FIGS. 19 and 20, items identical to those in the first embodiment are labeled with identical numerals.

As shown in FIG. 19, a driver stops a vehicle beside a parking target position (step S201). At this time, an initially-displayed screen 701 in FIG. 20 is displayed in a top view movie on the display 7. In the initially-displayed screen 701, total six parking modes, a perpendicular parking, a parallel parking and an angular parking each on right and left sides are displayed. Subsequently, the driver starts steering to select a parking mode (step S202). Also here, it is assumed that a steering wheel is steered from almost its neutral state.

Subsequently, it is judged whether or not the steering wheel is rotated to the left (step S203). When the steering wheel is rotated to the left, processes for displaying left-side parking modes that are changed over according to the steer angel are executed (steps S210 and S240 to S249). For processes for a case in which the steering wheel is rotated to the right (a case of a right-side parking), since controls similar to those for the left side are executed symmetrically, their detailed explanations are omitted. Hereinafter, processes are explained in detail with a leftward steering taken as an example.

When the step S203 is affirmative, it is judged whether or not the steer angle is equal-to or smaller-than −30° (step S210). When the steer angle is larger than −30° (NO in the step S210), its process flow returns to the step S202.

On the other hand, when the steer angle is equal-to or smaller-than −30° (YES in the step S210), it is judged whether or not the steer angle is equal-to or smaller-than −40° (step S240). When the steer angle is larger than −40° (NO in the step S240), i.e. within a steer angle range −30° to −40°, it is judged that a left-side perpendicular parking is selected and thereby a left-side perpendicular parking position (parking mode) is displayed on the display 7 in a selected state (step S249: screen 705 in FIG. 20). In a perpendicular parking, a displayed angle (parking frame angle) ω is not changed within the steer angle range −30° to −40° (constant with ω=0°). Note that the parking frame angle ω in the embodiment is set as an angle of a vehicle longitudinal direction at the parking target position with respect to a vehicle width direction at the vehicle stopped position as shown in screens 706c and 707a (counterclockwise is defined as plus).

Similarly, within a steer angle range −40° to −100° (NO in the step S241), it is judged that a left-side angular parking is selected and thereby a left-side angular parking position (parking mode) is displayed on the display 7 in a selected state (step S248: screens 706a to 706c in FIG. 20). In a case of the angular parking, the steer angle θ is detected by the steering sensor 8 within a steer angle range −40° to −100°, and the parking frame angle ω is changed according to the detected steer angle θ. The larger a magnitude of the steer angle θ is, the larger a magnitude of the parking frame angle ω is. In addition, since a rotational direction of the steering wheel coincides with a rotational direction of the angular parking frame on the top view movie 31, a driver can recognize it easily and thereby operability can be improved.

Similarly, within a steer angle range −100° to −110° (NO in the step S242), it is judged that a left-side parallel parking (the parking frame angle ω is an acute angle) is selected and thereby a left-side parallel parking position (parking mode) is displayed on the display 7 in a selected state (step S247: screen 707a in FIG. 20). However, the parallel parking in the step S247 is a parallel parking with an acute parking frame angle ω and the steer angle θ is detected by the steering sensor 8 within a steer angle range −100° to −110°, and the parking frame angle ω is changed according to the detected steer angle θ. Also here, the larger a magnitude of the steer angle θ is, the larger a magnitude of the parking frame angle ω is. In addition, since a rotational direction of the steering wheel coincides with a rotational direction of the parallel parking frame on the top view movie 31, a driver can recognize it and thereby operability can be improved.

Similarly, within a steer angle range −110° to −120° (NO in the step S243), it is judged that a left-side parallel parking (the parking frame angle ω=90°) is selected and thereby a left-side parallel parking position (parking mode) is displayed on the display 7 in a selected state (step S246: screen 707 in FIG. 20). The parking frame angle ω of the parking frame is not changed within the steer angle range −110° to −120° (constant with ω=90°). Since a screen of the top view movie 31 is fixed within the steer angle range −110° to −120°, a driver can easily select this parking mode that is frequently done.

Similarly, within a steer angle range −120° to −130° (NO in the step S244), it is judged that a left-side parallel parking (the parking frame angle ω is an obtuse angle) is selected and thereby a left-side angular parallel parking position (parking mode) is displayed on the display 7 in a selected state (step S245: screen 707b in FIG. 20). However, the parallel parking in the step S245 is a parallel parking with an obtuse parking frame angle ω and the steer angle θ is detected by the steering sensor 8 within a steer angle range −120° to −130°, and the parking frame angle ω is changed according to the detected steer angle θ. Also here, the larger a magnitude of the steer angle θ is, the larger a magnitude of the parking frame angle ω is. In addition, since a rotational direction of the steering wheel coincides with a rotational direction of the parallel parking frame on the top view movie 31, a driver can recognize it and thereby operability can be improved.

Note that, when the steer angle is equal-to or smaller-than −130° (YES in the step S244), it is judged that the parking mode selection is cancelled (step S214) and thereby the parking mode selection process is finished. After the parking target position (parking mode) including the parking frame angle ω is selected as explained above, the steering wheel is returned to the neutral position (step S230) to set the selected parking mode (step S231), and then the parking mode selection process is finished.

Figure 21:
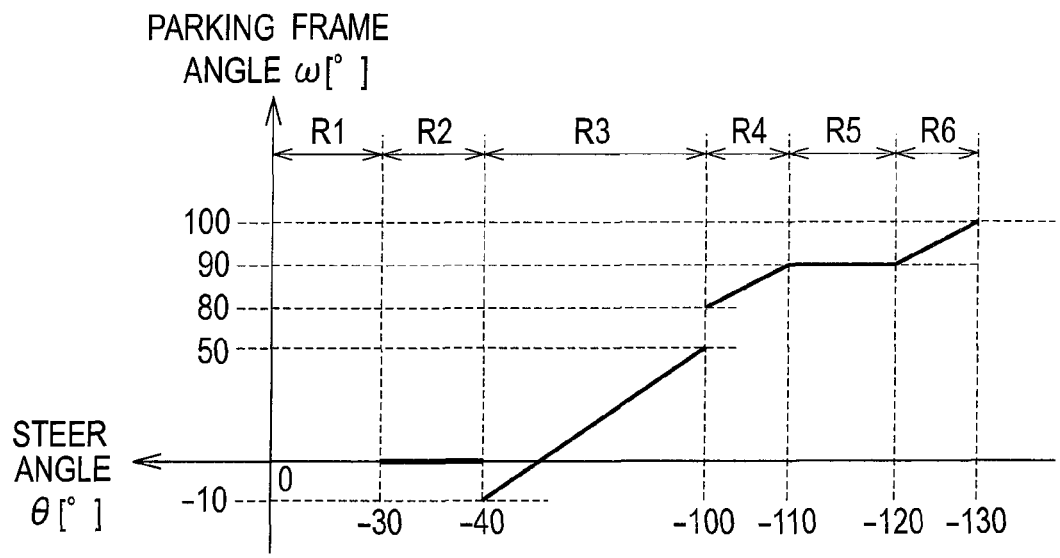
FIG. 21 It is a graph for explaining relation of steer angle and parking frame angle.
Figure 22:
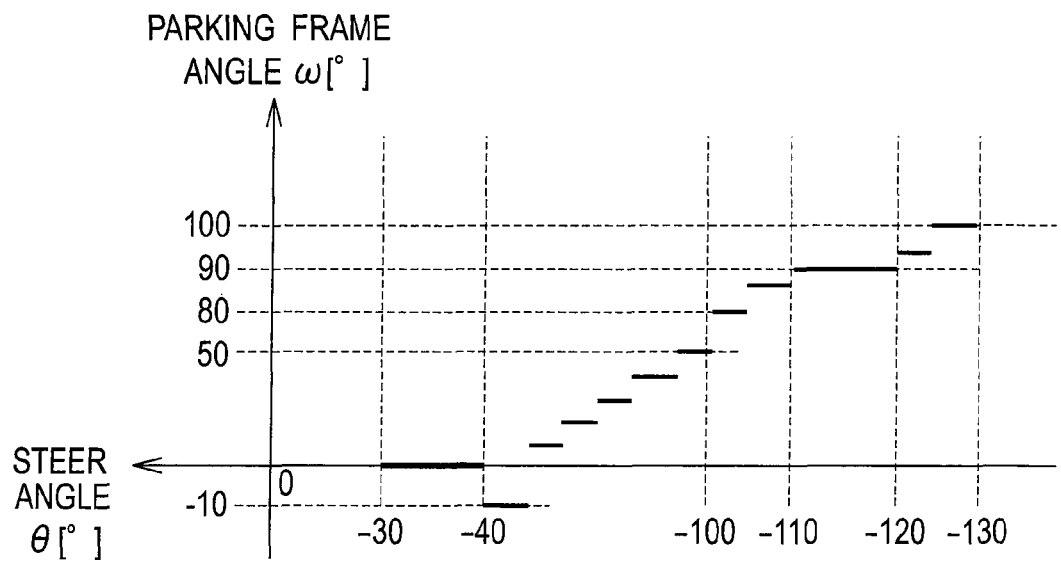
FIG. 22 It is a graph for explaining other relation of steer angle and parking frame angle.

The above-explained relation between the steer angle θ and the parking frame angle ω will be explained with reference to a graph shown in FIG. 21. As shown in FIG. 21, within a steer angle range R1 (parking mode setting range) in which the steer angle θ is +30° to −30°, the parking frame is not displayed. However, within a steer angle range R2 in which the steer angle θ is −30° to −40°, a perpendicular parking frame is displayed while the parking frame angle ω is 0° (constant). Then, within a steer angle range R3 in which the steer angle θ is −40° to −100°, an angular parking frame is displayed while the parking frame angle ω is continuously changed from −10° to 50°. Further, within a steer angle range R4 in which the steer angle θ is −100° to −110°, a parallel parking frame is displayed while the parking frame angle ω is continuously changed from 80° to 90°. Further, within a steer angle range R5 in which the steer angle θ is −110° to −120°, a parallel parking frame is displayed while the parking frame angle ω is 90° (constant). Further, within a steer angle range R6 in which the steer angle θ is −120° to −130°, a parallel parking frame is displayed while the parking frame angle ω is continuously changed from 90° to 100°.

Note that the graph in FIG. 21 shows a case in which the parking frame angle ω is continuously changed according to a change of the steer angle θ. However, as shown in a graph shown in FIG. 22, the parking frame angle ω may be changed in a step-by-step manner according to a change of the steer angle θ. In this case, flexibility of the parking frame angle ω able to be changed reduces, but a driver can easily done a selection and convenience can be improved due to no need of a minute angle adjustment.

Next, a detailed presentation method of the parking frame angle ω according to the steer angle θ will be explained with reference to FIG. 23.

Figure 23:
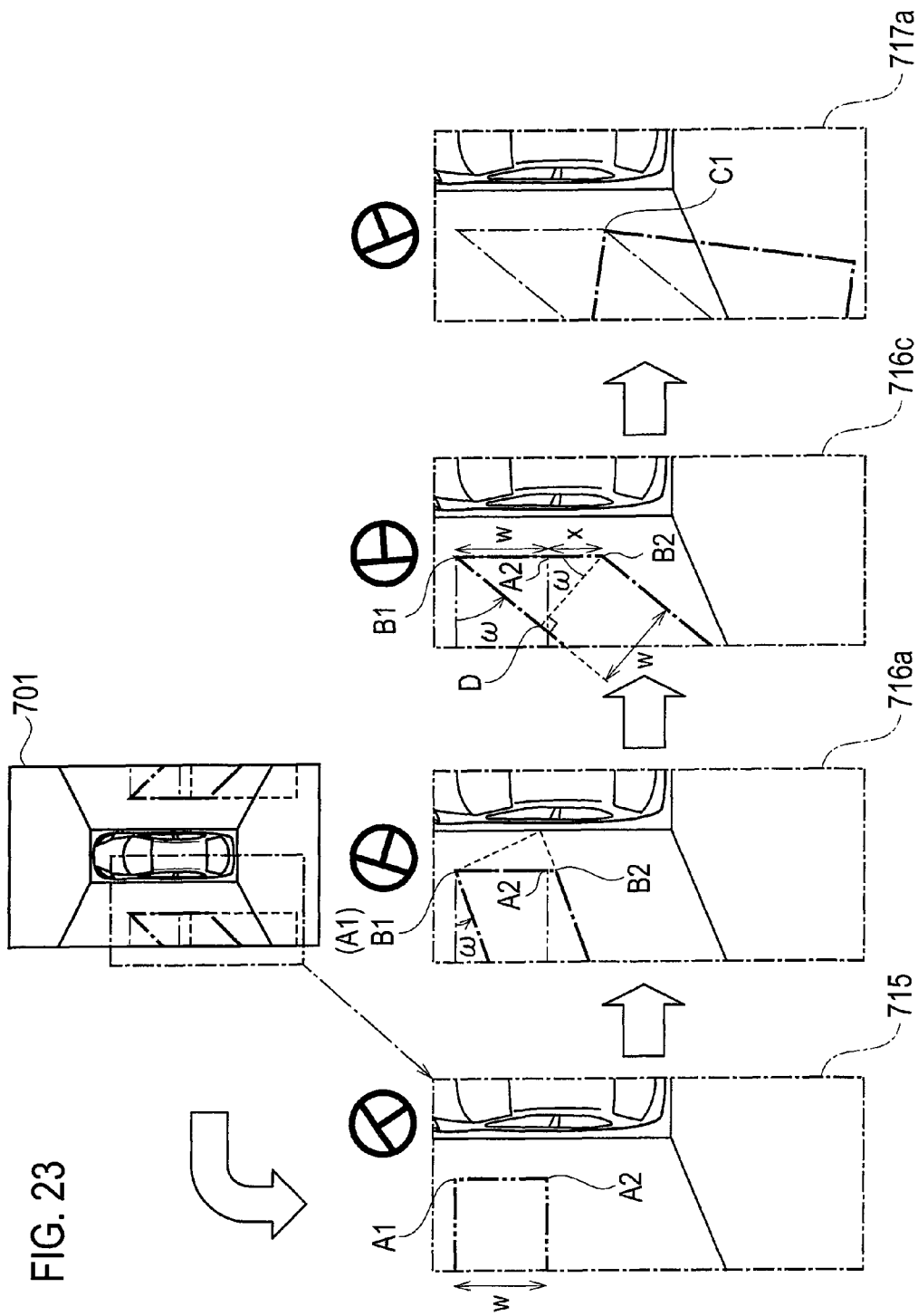
FIG. 23 It is a diagram for explaining a method for displaying screens in detail.

As shown in FIG. 23, in a case where the steering wheel is rotated to the left at the initially-displayed screen 701, a display screen 715 is displayed at a time when the steer angle θ becomes −30°. If the steering wheel is further rotated, the display screen 715 is changed to a display screen 716a at a time when the steer angle θ becomes −40°. Then, within the steer angle range −40° to −100°, a display screen is updated from the screen display 716a to a display screen 716c while the parking frame angle ω is increased according to a change of the steer angle θ. Then, the display screen 716c is changed to a display screen 717a at a time when the steer angle θ becomes −100°. Note that the display screens 715 to 717a in FIG. 23 are shown with each portion of the screens being enlarged so that they can be easily understood.

Vertices of the perpendicular parking frame shown in the display screen 715 are defined as A1 and A2, vertices of the angular parking frame shown in the display screen 716a are defined as B1 and B2, and a vertex of the parallel parking frame shown in the display screen 717a is defined as C1. The angular parking frames shown in the display screens 716a and 716c are rotated about the vertex A1. Therefore, when shifting from the display screen 715 to the display screen 716a, the vertex A1 coincides with the vertex B1. However, between the display screen 716a and the display screen 716c, the vertex B2 gradually gets away from the vertex A2. In addition, when sifting from the display screen 716c to the display screen 717a, it becomes easily understood to shift the angular parking frame to the parallel parking frame with the vertex B2 coincided with the vertex C1. Further, the parallel parking frame is rotated about the vertex C1.

Here, a method for calculating a distance x between the vertex B2 and the vertex A2 will be explained. Based on a width w of the perpendicular parking frame, the parking frame angle ω, and a triangle A1B2D in the display screen 716c, an equation (1) shown below is true.

$$(w+x) \cdot \cos \omega = w \quad (1)$$

Due to the above equation (1), the distance x is calculated by an equation (2) shown below.

$$x = (w/\cos \omega) - w \quad (2)$$

If the parking frame is shifted by coinciding the vertex B2 calculated based on the distance x with the vertex C1 when shifting from the display screen 716c to the display screen 717a, a feeling of strangeness along with shifting from the angular parking frame to the parallel parking frame can be reduced, so that a driver can see its presentation easily.

Figure 24:
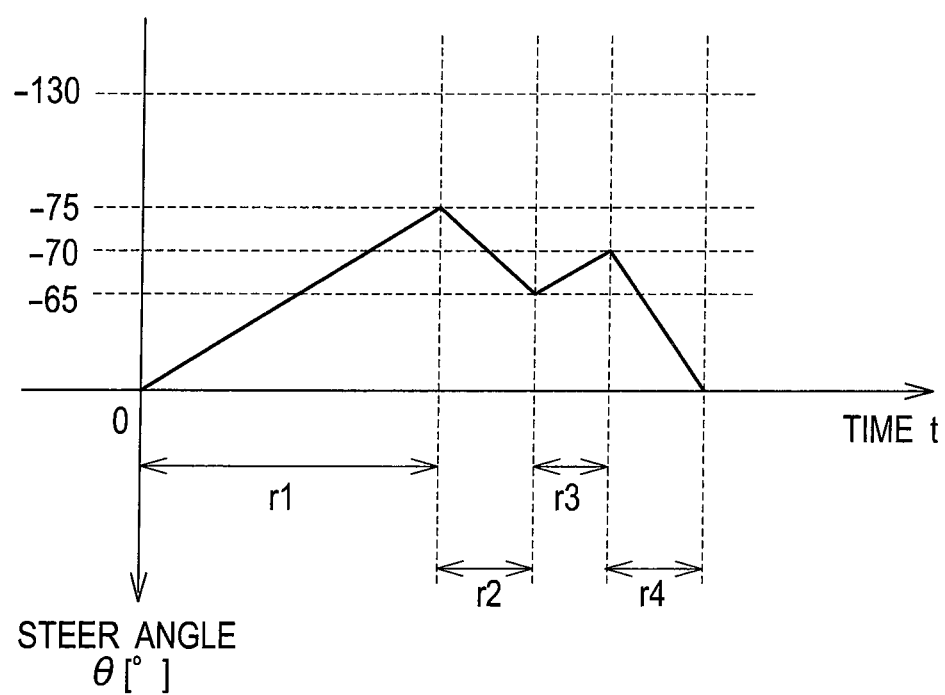
FIG. 24 It is a graph showing relation of steer angle and time.

Note that the parking frame angle ω of an angular parking frame once selected can be corrected. FIG. 24 shows an example of a change of the steer angle θ when correcting the parking frame angle ω. As shown in FIG. 24, the steering wheel is rotated to θ=−75° in a zone r1, and then rotated toward the neutral position in a zone r2. In this case, the angular parking frame angle ω is held at ω=25° (corresponding to θ=−75°) in the zone r2 (see FIG. 21). However, the steering wheel is rotated to the left again from θ=−65°, so that it is judged as a correction of the parking frame angle ω and the parking frame angle ω in the top view movie 31 is changed according to a change of the steer angle θ. Subsequently, the steering wheel is rotated to θ=−70° in a zone r3, and then returned to the neutral position in a zone r4. Therefore, the angular parking frame angle ω is held at ω=20° (corresponding to θ=−70°) in the zone r4, and then a parking mode with the angular parking frame angle ω=20° is set conclusively. If an angular parking frame angle ω is erroneously selected as explained above, it can be easily corrected by a steering operation.

[Advantages According to Fifth Embodiment]

According to the parking mode selection apparatus in the above-explained fifth embodiment, an angle of an angular parking and a parallel parking can be selected freely according to a steering operation, so that convenience can be improved.

In addition, since a rotational direction of the steering wheel coincides with a rotational direction of the parking frame on the screen, a driver can recognize it easily and thereby operability can be improved.

In addition, when shifting from the angular parking to a parallel parking on the display screen, since a vertex of the angular parking frame coincides with a vertex of the parallel parking frame, a feeling of strangeness along with sifting of the parking frames can be reduced, so that a driver can see its presentation easily.

Further, a selection (setting) of the parking angle can be redone, so that a correction of a parking mode can be done easily.

Sixth Embodiment

Next, a sixth embodiment will be explained with reference to FIGS. 25 to 28. Note that configurations of a parking mode selection apparatus 1 in the present embodiment are identical to those in the first embodiment. In addition, configurations identical or similar to those in the above-explained first to fifth embodiments are labeled with identical numerals, and their detailed explanations are omitted.

In the present embodiment, another control method is adopted for preventing an unintended cancel of an already-set parking mode brought by the above-explained undesirable rotation of the steering wheel caused by the residual distortion energy of tires. Here, a threshold value θth is set in the inside of the parking mode setting range ($-\alpha<\theta<\alpha$), and a problem caused by the residual distortion energy is overcome by using this threshold value θth.

Figure 25:
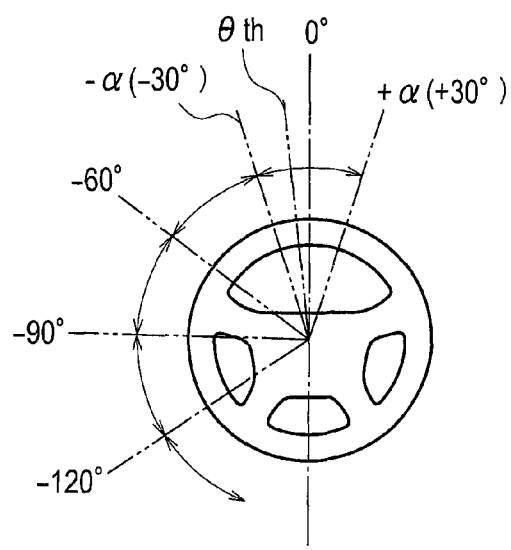
FIG. 25 It is a front view showing parking mode setting ranges and threshold values in a parking mode selection apparatus according to a sixth embodiment.

As shown in FIG. 25, the threshold value θth for a case of a left-side parking mode setting is set in the inside of the parking mode setting range ($-\alpha<\theta<\alpha$). In order to set a parking mode by returning the steering wheel to the neutral position after the parking mode has been selected by the leftward rotation of the steering wheel, it is needed to steer the steering wheel so that the steer angle θ passes through a border value $-\alpha$ and then further passes through the threshold value θth.

The rotational direction of the steering wheel caused by the residual distortion energy is left side in this case. In a case where the threshold value θth is set as explained above, the steer angle θ stays within a range $-\alpha<\theta\leq\theta\text{th}$ and never goes out from the parking mode setting range even when the steering wheel is rotated to the left by the residual distortion energy. In the other words, the threshold value θth is set to a value that can prevent the parking mode from being canceled. Note that, if the steering wheel is rotated to the left from the border value $-\alpha$, the parking mode selection can be redone. Namely, there is hysteresis between entering-into and going-out-from a steer angle range for setting the parking mode.

Figure 26:
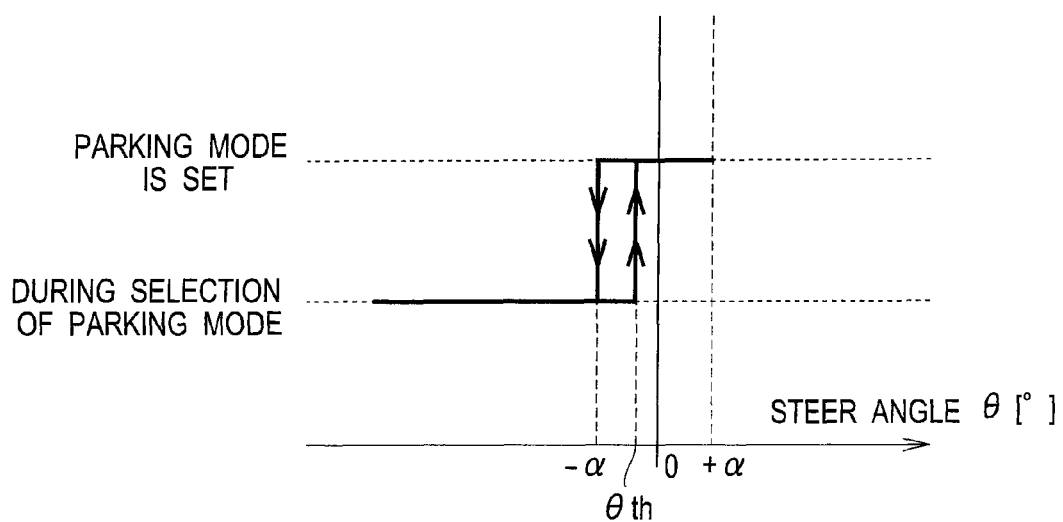
FIG. 26 It is a graph showing hysteresis between a steer angle and a parking mode setting.

Here, the above-mentioned hysteresis will be explained with reference to FIG. 26. As shown in FIG. 26, the steer angle θ is needed to be $-\alpha\leq\theta$ for selecting a parking mode, and then the steer angle is needed to be $\theta\text{th}<\theta<+\alpha$ for setting the selected parking mode. In addition, in a case where a parking mode has been already set and redoing a selection of a parking mode is to be made, the steer angle θ is needed to be $-\alpha\leq\theta$ again. Note that, although only a leftward steering operation is shown in FIGS. 25 and 26, a similar control is made symmetrically for a rightward operation.

Further, as explained above, the torque caused by the residual distortion energy changes according to the maximum value of the steer angle θ during the parking mode selection. Therefore, the threshold value θth may be changed according to the maximum steer angle θmax (>0: an absolute angle value). By changing the threshold value θth according to the maximum steer angle θmax, the problem caused by the residual distortion energy can be avoided more adequately. Specifically, the threshold value θth is made closer to the neutral position when the maximum steer angle θmax is large, and the threshold value θth is made closer to the border value ±α of the parking mode setting range when the maximum steer angle θmax is small.

Furthermore, in a case where the threshold value θth is changed, a width of the parking mode setting range may be made always constant by changing the opposite side border value +α according to an amount of change of the threshold value θth. Note that the maximum steer angle θmax in the following explanation includes information of its steered direction Pmem.

[Parking Mode Selection Process]

Configurations of a parking mode selection apparatus 1 in the present embodiment are identical to those in the first embodiment. A parking mode selection process by the parking mode selection apparatus 1 in the present embodiment will be explained with reference to a flowchart shown in FIG. 27.

Figure 27:
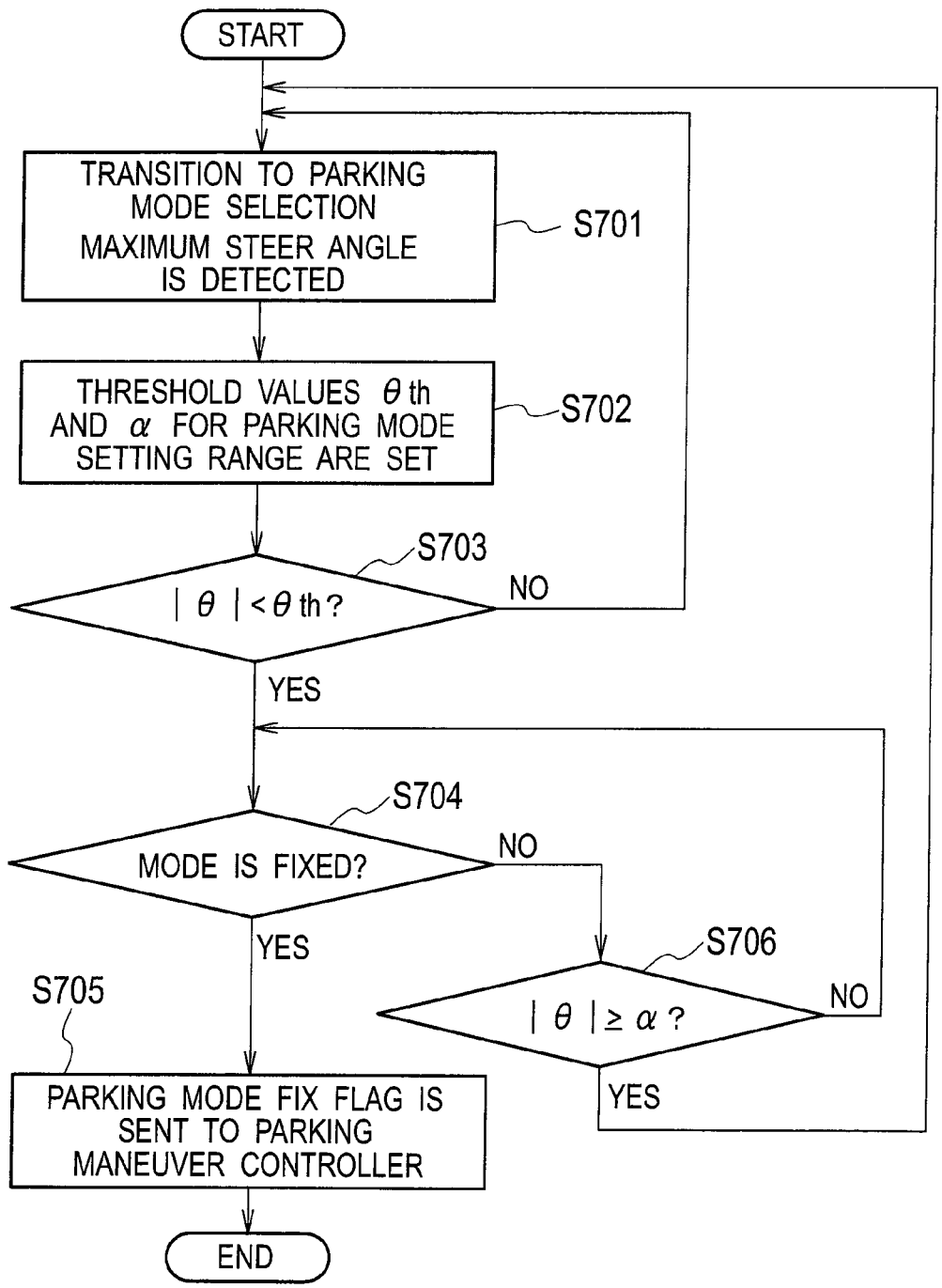
FIG. 27 It is a flowchart showing a parking mode setting and fixing process.

As shown in FIG. 27, it goes into a parking mode selection, and the maximum steer angle θmax during the parking mode selection is detected (step S701). Note that, since the parking mode selection is explained in the above embodiments, its detailed explanation is omitted here (see FIGS. 6 and 19, and so on). In addition, since the detection of the maximum steer angle θmax is also explained in the above embodiments, its detailed explanation is omitted here (see FIG. 14 and so on).

Subsequently, a preset table or the like is retrieved and then the threshold value θth (<0 or >0 depending on the rotational direction) and the absolute border value α (>0) of the parking mode setting range are set based on the detected maximum steer angle θmax (step S702). Setting of the threshold value θth and the absolute border value α is done by the parking mode selector 4. Note that the absolute border value α is variably set here, but it may be set as a fixed value like as in the above embodiments. In addition, as already explained, only the opposite side border value +α (or −α) may be changed.

It is judged whether or not the steer angle θ becomes closer to the neutral position than the threshold value θth (|θ|<θth) (step S703). If not |θ|<θth (NO in step S703), its process flow returns to the step S701 because it is during the parking mode election. On the other hand, if |θ|<θth (YES in step S703), a parking mode is set, and then it is judged whether or not the parking mode that has been set is fixed by the parking mode selector 4 (step S704). As explained above, the parking mode that has been set is fixed when a driver leaves his/her foot off from a brake pedal. Note that the fixedness of the parking mode may be done by a driver's pressing of a fixing button, or triggered by a detection of a start of a vehicle running (a detection result of a road wheel sensor indicates a vehicle speed 0 km/h).

If the parking mode is fixed (YES in step S704), the parking mode selector 4 sends a parking mode fix flag to the parking mode computing unit 5 (step S705), and then the parking mode selection process is finished. The parking mode computing unit 5 computes a parking route to a parking target position based on the fixed parking mode, and sends the computed parking route to the parking mode interposition unit 3 and controls the parking maneuver unit 10 via the parking maneuver controller 9 based on the computed parking route. On the other hand, if the parking mode is not fixed (NO in step S704), it is judged whether or not the steer angle goes out from the parking mode setting range (|θ|≥α?) (step S706).

If |θ|≥α (YES in step S706), the process flow returns to the step S701 in order to redo the parking mode selection. On the other hand, if not |θ|≥α (NO in step S706), the process flow returns to the step S704 with the parking mode that has been set is maintained because the parking mode that has been set is not fixed, and the process flow loops until the paring mode is fixed.

[Advantages According to Sixth Embodiment]

According to the parking mode selection apparatus in the above-explained sixth embodiment, a threshold value θth is set within the parking mode setting range and a parking mode is set when passing through the threshold value θth. Therefore, it is prevented that a steering wheel is returned to a parking mode selection range due to the residual distortion energy of tires, so that setting of a parking mode can be done unfailingly.

Figure 28:
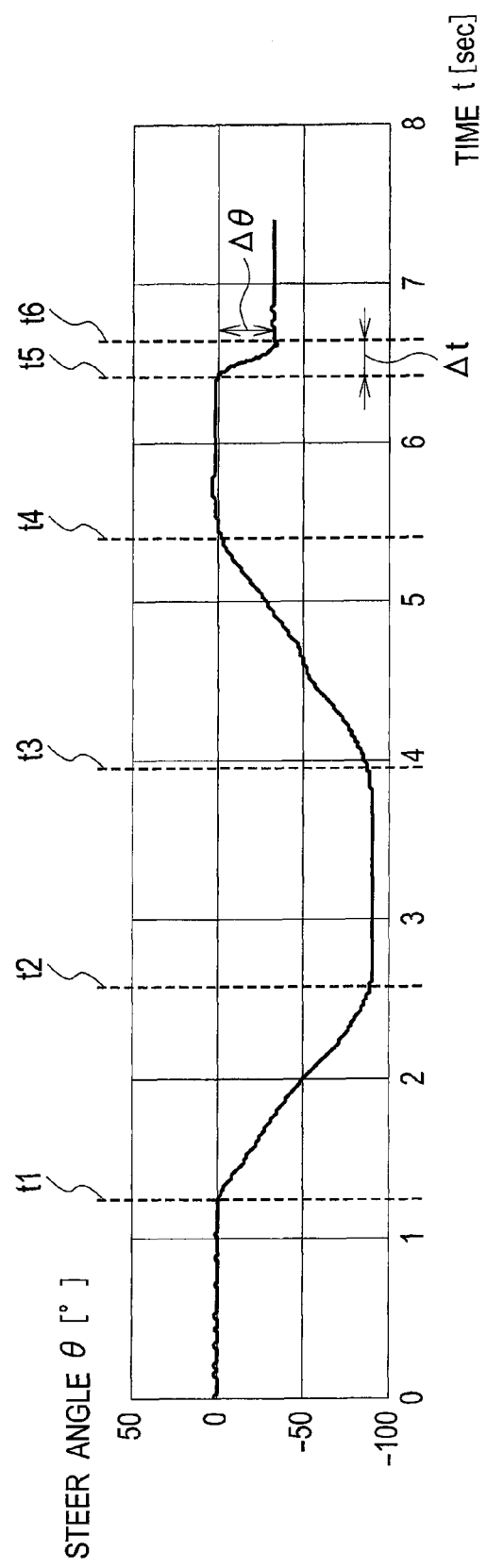
FIG. 28 It is a graph showing relation of steer angle and time.

Explanation will be made with reference to FIG. 28. As shown in FIG. 28, a driver starts to rotate a steering wheel to the left (θ<0°) at a time t1, and steers it to about −90° at a time t2. Subsequently, the driver starts to rotate the steering wheel to the right at a time t3, and returns it the neutral position (θ=0°) at a time t4. Then, the driver leaves his/her hands off from the steering wheel at a time t5, so that the steering wheel is returned by Δθ due to the residual distortion energy of tires.

At this moment, the steer angle θ stays within the parking mode setting range (−α<θ<α) even if the steering wheel is returned due to the residual distortion energy by setting the threshold value θth so that an angular difference (α+θth) between the border value −α and the threshold value θth (<0) is made larger than Δθ, so that it is prevented from going out from the parking mode setting range by itself.

In addition, a parking mode can be set more adequately according to a magnitude of the residual distortion energy by changing the threshold value θth according to the maximum steer angle θmax (i.e. by making the threshold value θth closer to the neutral position when the maximum steer angle θmax is large, and making the threshold value θth closer to the border value ±α when the maximum steer angle θmax is small).

In addition, a parking mode setting range can be always made constant by changing the opposite side border value +α according to the maximum steer angle θmax.

In addition, hysterisis is made occurred by differentiating the threshold value θth for setting a parking mode from a parking mode setting range from the border value ±α from a parking mode setting range to the parking mode selection range. Therefore, even if a steering wheel is steered back by the residual distortion energy, it is prevented from being steered back to the parking mode selection range and thereby a parking mode can be set unfailingly.

Seventh Embodiment

Next, a seventh embodiment will be explained with reference to FIG. 29. Note that configurations of a parking mode selection apparatus 1 in the present embodiment are identical to those in the first embodiment (i.e. the sixth embodiment). In addition, configurations identical or similar to those in the above-explained first to sixth embodiments are labeled with identical numerals, and their detailed explanations are omitted. But, the steering sensor 8 in the present embodiment can detect a torque applying to a steering shaft in addition to a steer angle θ. Note that the steering sensor 8 may be divided to a steer angle sensor for detecting a steer angle θ and a torque sensor for detecting a torque. In the present embodiment, the above-explained threshold value θth is not set, and a torque applying to a steering shaft is detected. It is judged that a driver leaves his/her hands away from a steering wheel if this torque is smaller than a predetermined value for a certain period of time, and thereby a parking mode is set based on a steer angle before leaving it away.

[Parking Mode Selection Process]

A parking mode selection process by the parking mode selection apparatus 1 in the present embodiment will be explained with reference to a flowchart shown in FIG. 29.

As shown in FIG. 29, it goes into a parking mode selection, and the maximum steer angle θmax during the parking mode selection is detected (step S801). Note that, since the parking mode selection is explained in the above embodiments, its detailed explanation is omitted here (see FIGS. 6 and 19, and so on). In addition, since the detection of the maximum steer angle θmax is also explained in the above embodiments, its detailed explanation is omitted here (see FIG. 14 and so on).

As mentioned above, the threshold value θth is not set in the present embodiment, a parking mode is set based on a parking mode setting range ($-\alpha<\theta<+\alpha$) similar to that in the first to fifth embodiments. Therefore, it is judged whether or not the steer angle θ is in the parking mode setting range ($-\alpha<\theta<+\alpha$) (step S802). If not in $-\alpha<\theta<+\alpha$ (NO in step S802), a parking mode is not set and its process flow returns to the step S801 to update he maximum steer angle θmax.

On the other hand, if in $-\alpha<\theta<+\alpha$ (YES in step S802), a process flow shifts to a parking mode setting (step S803). At this time, a presentation for indicating that a parking mode will be set may be displayed on the display 7.

Upon shifting to the parking mode setting, it is judged whether or not the torque value is smaller than the predetermined value for the certain period of time (step S804). If the torque value is not smaller than the predetermined value for the certain period of time (NO in step S804), it can be judged that a driver still holds a steering wheel and thereby the process flow returns to the step S802 to repeat the judgment whether or not in the parking mode setting range.

On the other hand, if the torque value is smaller than the predetermined value for the certain period of time (YES in step S804), it can be judged that a driver leaves his/her hands away from a steering wheel, in this case, the steering wheel may rotate by itself due to the residual distortion energy of tires as explained above. Therefore, compensation is made according to the steer angle θ at the time when the steering wheel is left away.

In the present embodiment, the steer angle θ is compensated as explained below. The steer angle θ at a time (e.g. a time t5 in FIG. 28) got back from a time when the step S804 is affirmed (a time t6 in FIG. 28) by a predetermined time duration (a time duration Δt in FIG. 28) is handled as a compensated steer angle θ. By using the steer angle θ at the previous time t5, the steer angle difference Δθ forcibly rotated due to the residual distortion energy can be compensated.

In the present embodiment, it is judged whether or not the compensated steer angle is in the parking mode setting range ($-\alpha<\theta<+\alpha$) (step S806). If not within $-\alpha<$(compensated θ)$<+\alpha$ (NO in step S806), it is judged that a driver rotates the steering wheel not due to the residual distortion energy and thereby the process flow returns to the step S801 in order to redo the parking mode selection.

On the other hand, if within $-\alpha<$(compensated θ)$<+\alpha$ (YES in step S806), a parking mode is set and whether or not the parking mode that has been set is fixed by the parking mode selector 4 (step S807). As explained above, the parking mode that has been set is fixed when a driver leaves his/her foot off from a brake pedal. Note that the fixedness of the parking mode may be done by a driver's pressing of a fixing button, or triggered by a detection of a start of a vehicle running (a detection result of a road wheel sensor indicates a vehicle speed 0 km/h).

If the parking mode is fixed (YES in step S807), the parking mode selector 4 sends a parking mode fix flag to the parking mode computing unit 5 (step S808), and then the parking mode selection process is finished. The parking mode computing unit 5 computes a parking route to a parking target position based on the fixed parking mode, and sends the computed parking route to the parking mode interposition unit 3 and controls the parking maneuver unit 10 via the parking maneuver controller 9 based on the computed parking route. On the other hand, if the parking mode is not fixed (NO in step S807), it is judged whether or not the steer angle goes out from the parking mode setting range ($|\theta|\geq\alpha$?) (step S809).

If $|\theta|\geq\alpha$ (YES in step S809), the process flow returns to the step S801 in order to redo the parking mode selection. On the other hand, if not $|\theta|\geq\alpha$ (NO in step S809), the process flow returns to the step S807 with the parking mode that has been set is maintained because the parking mode that has been set is not fixed, and the process flow loops until the paring mode is fixed.

[Advantages According to Seventh Embodiment]

According to the parking mode selection apparatus in the above-explained seventh embodiment, a parking mode is set when a torque of a steering shaft is equal-to or lower-than a predetermined value, i.e. a driver leaves his/her hands off from the steering wheel, so that a parking mode can be set more adequately.

In addition, at this time, since it is judged whether or not within the parking mode setting range based on the compensated steer angle θ with a value before the predetermined time duration Δt, a steer angle difference Δθ forcibly rotated due to the residual distortion energy can be compensated and thereby a parking mode can be set more adequately.

Eighth Embodiment

Next, an eighth embodiment will be explained. Configurations of a parking mode selection apparatus 1 in the present embodiment are identical to those in the first embodiment (i.e. the seventh embodiment). In addition, configurations identical or similar to those in the above-explained first to seventh embodiments are labeled with identical numerals, and their detailed explanations are omitted. Note that the parking mode computing unit 5 in the present embodiment is provided with a filtering function (e.g. low range pass filter) and filters a change of the steer angle θ. Specifically, it filers a change of the steer angle θ for a predetermined time duration (e.g. a time duration Δt in FIG. 28) before a time when the torque of the steering shaft becomes equal-to or lower-than a predetermined value for a certain period of time (a time t6 in FIG. 28), and then it is judged whether or not the steer angle θ that has been filtered and then compensated is in the parking mode setting range ($-\alpha<\theta<+\alpha$).

[Parking Mode Selection Process]

A flowchart for a parking mode selection process by the parking mode selection apparatus 1 in the present embodiment is identical to the flow chart in FIG. 29. However, as explained above, a content of compensation of the steer angle θ in step S805 is only different. Therefore, only the step S805 will be explained in detail.

In the step S805 in the present embodiment, the parking mode computing unit 5 filters time-series data for a predetermined time duration (e.g. a time duration Δt in FIG. 28)

before a time when the step S804 is affirmative (a time t6 in FIG. 28). As a result, a cut-off frequency and a gain are obtained by use of a time constant computed from a change rate of the steer angle θ for the time duration Δt in FIG. 28. Then, the judgment in the step S806 is done based on the steer angle θ compensated through the filtering.

[Advantages According to Eighth Embodiment]

According to the parking mode selection apparatus in the above-explained eighth embodiment, a filtering is made to a change of the steer angle θ for a predetermined time duration Δt before a time when a torque of a steering shaft becomes equal-to or lower-than a predetermined value. Then, since it is judged whether or not within the parking mode setting range based on the compensated steer angle θ through the filtering, a steer angle difference Δθ forcibly rotated due to the residual distortion energy can be compensated and thereby a parking mode can be set more adequately.

The entire contents of a Japanese Patent Application No. 2010-132028 (filed Jun. 9, 2010), a Japanese Patent Application No. 2010-132037 (filed Jun. 9, 2010), and a Japanese Patent Application No. 2010-132055 (filed Jun. 9, 2010) are incorporated herein by reference. Although the invention has been described above by reference to certain embodiments of the invention, the invention is not limited to the embodiments described above. Scope of the present invention is determined in the context of the claims.

The invention claimed is:

1. A parking mode selection apparatus for selecting one parking mode for a vehicle from among a plurality of parking modes including a plurality of right-side parking modes and a plurality of left-side parking modes, the right-side parking modes and the left-side parking modes including at least a perpendicular parking mode and a parallel parking mode, the parking mode selection apparatus comprising:

a steer angle detector that detects a steer angle of a steering wheel;

an operation detector that detects, based on the steer angle detected by the steer angle detector, a predetermined operation in which the steering wheel is steered to a right or a left and then returned to a neutral position; and a parking mode selector that selects one of a plurality of steer angle ranges that are set with respect to a steer angle of the steering wheel based on the steer angle detected by the steer angle detector during the predetermined operation, when the predetermined operation is detected by the operation detector, the plurality of right-side parking modes and the plurality of left-side parking modes being allocated to the plurality of steer angle ranges, respectively, wherein the parking mode selector selects (1) in a case where a steered direction of the steering wheel in the predetermined operation is to the right, one right-side parking mode to which the one of the plurality of steer angle ranges is allocated from among the plurality of right-side parking modes including at least the perpendicular parking mode and the parallel parking mode, based on the steer angle detected by the steer angle detector, and (2) in a case where a steered direction of the steering wheel in the predetermined operation is to the left, one left-side parking mode to which the one of the plurality of steer angle ranges is allocated from among the plurality of left-side parking modes including at least the perpendicular parking mode and the parallel parking mode, based on the steer angle detected by the steer angle detector.

2. The parking mode selection apparatus according to claim 1, further comprising:

a guidance output unit that outputs a display screen guidance or a voice guidance for prompting a return of the steering wheel to the neutral position.

3. The parking mode selection apparatus according to claim 2, further comprising:

a torque generator that generates a torque toward the neutral position on the steering wheel.

4. The parking mode selection apparatus according to claim 3, wherein the torque generator generates the torque toward the neutral position only when the steer angle is within a predetermined range with respect to the neutral position.

5. The parking mode selection apparatus according to claim 1, wherein the plurality of right-side parking modes and the plurality of left-side parking modes further include an angular parking mode.

6. The parking mode selection apparatus according to claim 1, wherein the plurality of right-side parking modes and the plurality of left-side parking modes further include an angular parking mode, the parking mode selection apparatus further comprises a display for presenting a parking mode that is being selected on a top view movie including an environment of the vehicle, and when an angular parking mode is selected as the parking mode, the parking mode selector presents the angular parking mode on the display while changing a parking angle according to the steer angle detected by the steer angle detector.

7. The parking mode selection apparatus according to claim 6, wherein the parking mode selector changes a rotational direction of a parking frame associated with the parking angle according to the steered direction of the steering wheel and the steer angle.

8. The parking mode selection apparatus according to claim 6, wherein when a parallel parking mode is selected as the parking mode, the parking mode selector presents the parallel parking mode on the display while changing the parking angle according to the steer angle detected by the steer angle detector.

9. The parking mode selection apparatus according to claim 6, wherein the change of the parking angle is presented on the display in a step-by-step manner according to the steer angle.

10. The parking mode selection apparatus according to claim 6, wherein the parking mode selector shifts, when shifting the parking mode from an angular parking mode to a parallel parking mode on the display, the parking mode by coinciding one vertex of a parking frame indicating the parking mode for the angular parking mode with one vertex of a parking frame indicating the parking mode for the parallel parking mode.

11. The parking mode selection apparatus according to claim 1, wherein a parking mode setting steer angle range that includes the neutral position, and parking mode selection steer angle ranges that are associated with each of the respective parking modes, are set, the parking mode selector sets a threshold value within the parking mode setting steer angle range on a side of the steered direction to the right or the left with respect to the neutral position, and the operation detector detects the predetermined operation when the steering wheel is returned to an inside of the parking mode setting steer angle range and then passes through the threshold value.

12. The parking mode selection apparatus according to claim 11, wherein the parking mode selector changes the threshold value according to a maximum value of the steer angle while the parking mode is being selected.

13. The parking mode selection apparatus according to claim 11, wherein, after the operation detector detects the predetermined operation when the steer angle is returned to the inside of the parking mode setting steer angle range and passes through the threshold value, the steering wheel is steered to the right or the left again, and the steer angle enters into the parking mode selection steer angle ranges outside of the parking mode setting steer angle range, the parking mode selector can select the parking mode once again.

14. The parking mode selection apparatus according to claim 1, wherein a parking mode setting steer angle range that includes the neutral position, and parking mode selection steer angle ranges that are associated with each of the respective parking modes, are set, the parking mode selection apparatus further comprises a torque detector that detects a torque applied to a steering shaft, and the operation detector compensates the steer angle when the steering wheel is returned to an inside of the parking mode setting steer angle range and the torque detected by the torque detector is equal-to or smaller-than a predetermined value, and then detects whether or not the predetermined operation is completed based on the compensated steer angle.

15. The parking mode selection apparatus according to claim 14, wherein the operation detector sets, as the compensated steer angle, a steer angle at a predetermined time before the torque becomes equal-to or smaller-than the predetermined value, and detects the predetermined operation if the compensated steer angle is within the parking mode setting steer angle range.

16. The parking mode selection apparatus according to claim 14, wherein the operation detector filters a change of the steer angle for a predetermined time duration before a time when the torque becomes equal-to or smaller-than the predetermined value to set the filtered steer angle as the compensated steer angle, and detects the predetermined operation if the compensated steer angle is within the parking mode setting steer angle range.

17. A parking mode selection apparatus for selecting one parking mode for a vehicle from among a plurality of parking modes including a plurality of right-side parking modes and a plurality of left-side parking modes, the right-side parking modes and the left-side parking modes including at least a perpendicular parking mode and a parallel parking mode, the parking mode selection apparatus comprising:

a steer angle detection means that detects a steer angle of a steering wheel;

an operation detection means that detects, based on the steer angle detected by the steer angle detection means, a predetermined operation in which the steering wheel is steered to a right or a left and then returned to a neutral position; and a parking mode selection means that selects one of a plurality of steer angle ranges that are set with respect to a steer angle of the steering wheel based on the steer angle detected by the steer angle detection means during the predetermined operation, when the predetermined operation is detected by the operation detection means, the plurality of right-side parking modes and the plurality of left-side parking modes being allocated to the plurality of steer angle ranges, respectively, wherein the parking mode selection means selects (1) in a case where a steered direction of the steering wheel in the predetermined operation is to the right, one right-side parking mode to which the one of the plurality of steer angle ranges is allocated from among the plurality of right-side parking modes including at least the perpendicular parking mode and the parallel parking mode, based on the steer angle detected by the steer angle detection means, and (2) in a case where a steered direction of the steering wheel in the predetermined operation is to the left, one left-side parking mode to which the one of the plurality of steer angle ranges is allocated from among the plurality of left-side parking modes including at least the perpendicular parking mode and the parallel parking mode, based on the steer angle detected by the steer angle detection means.

18. A parking mode selection method for selecting one parking mode for a vehicle from among a plurality of parking modes including a plurality of right-side parking modes and a plurality of left-side parking modes, the right-side parking modes and the left-side parking modes including at least a perpendicular parking mode and a parallel parking mode, the method comprising:

detecting a steer angle of a steering wheel;

detecting, based on the detected steer angle, a predetermined operation in which the steering wheel is steered to a right or a left and then returned to a neutral position; and selecting one of a plurality of steer angle ranges that are set with respect to a steer angle of the steering wheel based on the steer angle detected during the predetermined operation, when the predetermined operation is detected, the plurality of right-side parking modes and the plurality of left-side parking modes being allocated to the plurality of steer angle ranges, respectively, wherein the selecting comprises (1) in a case where a steered direction of the steering wheel in the predetermined operation is to the right, one right-side parking mode to which the one of the plurality of steer angle ranges is allocated from among the plurality of right-side parking modes including at least the perpendicular parking mode and the parallel parking mode, based on the detected steer angle, and (2) in a case where a steered direction of the steering wheel in the predetermined operation is to the left, one left-side parking mode to which the one of the plurality of steer angle ranges is allocated from among the plurality of left-side parking modes including at least the perpendicular parking mode and the parallel parking mode, based on the detected steer angle.

19. The parking mode selection apparatus according to claim 1, wherein the plurality of right-side parking modes and the plurality of left-side parking modes further include an angular parking mode, and each of the plurality of parking modes is associated with a predetermined parking mode selection steer angle range based on a degree of deviation from the neutral position to each of the right and the left, according to the following order of an increasing degree of deviation: a perpendicular parking mode, an angular parking mode, and a parallel parking mode.

20. The parking mode selection apparatus according to claim 19, wherein a target position is set at a center of each parking mode selection steer angle range associated with each of the plurality of parking modes, and the parking mode selection apparatus further comprises a torque generator that generates a torque toward the neutral position when the steer angle becomes misaligned from the target position.

21. The parking mode selection apparatus according to claim 1, wherein each of the plurality of parking modes is associated, with a predetermined parking mode selection steer angle range based on a frequency of selection of each of the parking modes.

\* \* \* \* \*